(12) United States Patent
Ahn et al.

(10) Patent No.: US 8,621,478 B2
(45) Date of Patent: Dec. 31, 2013

(54) MULTIPROCESSOR SYSTEM WITH MULTIPLE CONCURRENT MODES OF EXECUTION

(75) Inventors: Daniel Ahn, Yorktown Heights, NY (US); Luis H. Ceze, Urbana, IL (US); Dong Chen, Croton On Hudson, NY (US); Alan Gara, Mount Kisco, NY (US); Philip Heidelberger, Cortlandt Manor, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/008,502

(22) Filed: Jan. 18, 2011

(65) Prior Publication Data

US 2011/0219381 A1   Sep. 8, 2011

Related U.S. Application Data

(60) Provisional application No. 61/299,911, filed on Jan. 29, 2010, provisional application No. 61/295,669, filed on Jan. 15, 2010.

(51) Int. Cl.
*G06F 9/46* (2006.01)

(52) U.S. Cl.
USPC ........................................................ 718/104

(58) Field of Classification Search
None
See application file for complete search history.

(56) References Cited

U.S. PATENT DOCUMENTS

| | | | |
|---|---|---|---|
| 5,895,492 A | 4/1999 | Greenspan et al. | |
| 6,212,605 B1 | 4/2001 | Arimilli et al. | |
| 6,347,360 B1 | 2/2002 | Moudgal et al. | |
| 6,356,983 B1 | 3/2002 | Parks | |
| 6,460,130 B1 | 10/2002 | Trull et al. | |
| 7,376,800 B1 * | 5/2008 | Choquette et al. | 711/147 |
| 7,404,041 B2 * | 7/2008 | Gara et al. | 711/121 |
| 7,523,266 B2 * | 4/2009 | Chaudhry et al. | 711/141 |
| 7,657,880 B2 * | 2/2010 | Wang et al. | 717/149 |
| 7,814,378 B2 * | 10/2010 | Manovit et al. | 714/718 |
| 7,836,260 B2 * | 11/2010 | Gara et al. | 711/137 |
| 8,060,857 B2 * | 11/2011 | Biggerstaff | 717/106 |
| 8,180,977 B2 * | 5/2012 | Rajwar et al. | 711/154 |
| 8,185,700 B2 * | 5/2012 | Gimeno et al. | 711/141 |
| 2002/0083297 A1 | 6/2002 | Modelski et al. | |
| 2002/0133672 A1 | 9/2002 | Van De Waerdt et al. | |
| 2003/0014597 A1 | 1/2003 | van de Waerdt | |
| 2004/0193845 A1 | 9/2004 | Thimmannagari et al. | |

(Continued)

OTHER PUBLICATIONS

Office Action dated Nov. 26, 2012 received in a related U.S. Patent Application, namely U.S. Appl. No. 13/008,546.

(Continued)

*Primary Examiner* — Van Nguyen
(74) *Attorney, Agent, or Firm* — Scully, Scott, Murphy & Presser, P.C.; Daniel P. Morris, Esq.

(57) ABSTRACT

A multiprocessor system supports multiple concurrent modes of speculative execution. Speculation identification numbers (IDs) are allocated to speculative threads from a pool of available numbers. The pool is divided into domains, with each domain being assigned to a mode of speculation. Modes of speculation include TM, TLS, and rollback. Allocation of the IDs is carried out with respect to a central state table and using hardware pointers. The IDs are used for writing different versions of speculative results in different ways of a set in a cache memory.

17 Claims, 32 Drawing Sheets

(56) References Cited

U.S. PATENT DOCUMENTS

| | | |
|---|---|---|
| 2005/0204119 A1 | 9/2005 | Saha |
| 2006/0095680 A1 | 5/2006 | Park et al. |
| 2006/0161919 A1 | 7/2006 | Onufryk et al. |
| 2007/0028021 A1 | 2/2007 | Gasloms |
| 2007/0168619 A1 | 7/2007 | Hutton et al. |
| 2007/0192540 A1 | 8/2007 | Gara et al. |
| 2007/0294481 A1 | 12/2007 | Hoover et al. |
| 2008/0195820 A1 | 8/2008 | Lais et al. |
| 2008/0288819 A1* | 11/2008 | Heller, Jr. .................. 714/19 |
| 2008/0307169 A1 | 12/2008 | Averill et al. |
| 2008/0313437 A1 | 12/2008 | Gschwind |
| 2009/0031310 A1 | 1/2009 | Lev et al. |
| 2009/0083488 A1 | 3/2009 | Madriles Gimeno et al. |
| 2009/0150890 A1* | 6/2009 | Yourst ...................... 718/102 |
| 2009/0177847 A1* | 7/2009 | Ceze et al. ................. 711/152 |
| 2009/0235262 A1 | 9/2009 | Ceze et al. |
| 2009/0276581 A1 | 11/2009 | Moga et al. |
| 2010/0169577 A1 | 7/2010 | Kiyota |
| 2010/0205609 A1 | 8/2010 | Cypher |
| 2010/0332765 A1 | 12/2010 | Cypher |
| 2011/0016470 A1* | 1/2011 | Cain et al. .................. 718/101 |
| 2011/0066811 A1 | 3/2011 | Sander et al. |

OTHER PUBLICATIONS

Office Action dated Apr. 3, 2013 received in a related U.S. Appl. No. 13/008,546.

Office Action dated Apr. 15, 2013 received in a related U.S. Appl. No. 13/008,583.

Notice of Allowance dated May 7, 2013 received in a related U.S. Appl. No. 12/984,252.

* cited by examiner

WRITTEN BY ID1: NSPEC 3210

WRITTEN BY ID2: UNDEFINED 3220 | VERSION1 3230 | UNDEFINED 3240

READ BY ID2: UNDEFINED 3250 | VERSION 2 3260 | UNDEFINED 3260

(additional row): NSPEC 3270 | VERSION 2 3280 | NSPEC 3285 | VERSION1 3290 | NSPEC 3300

FIG. 3E

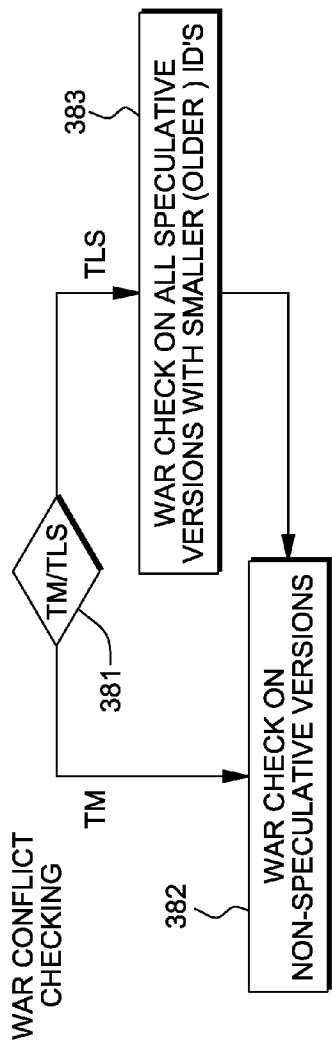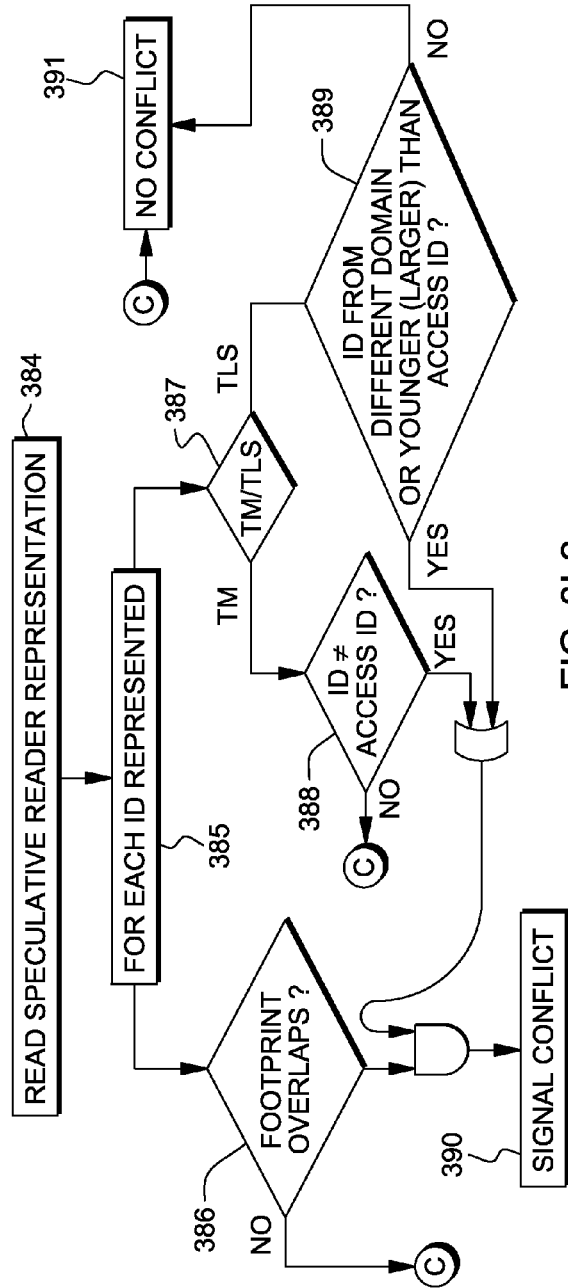
FIG. 3I-1
FIG. 3I-2

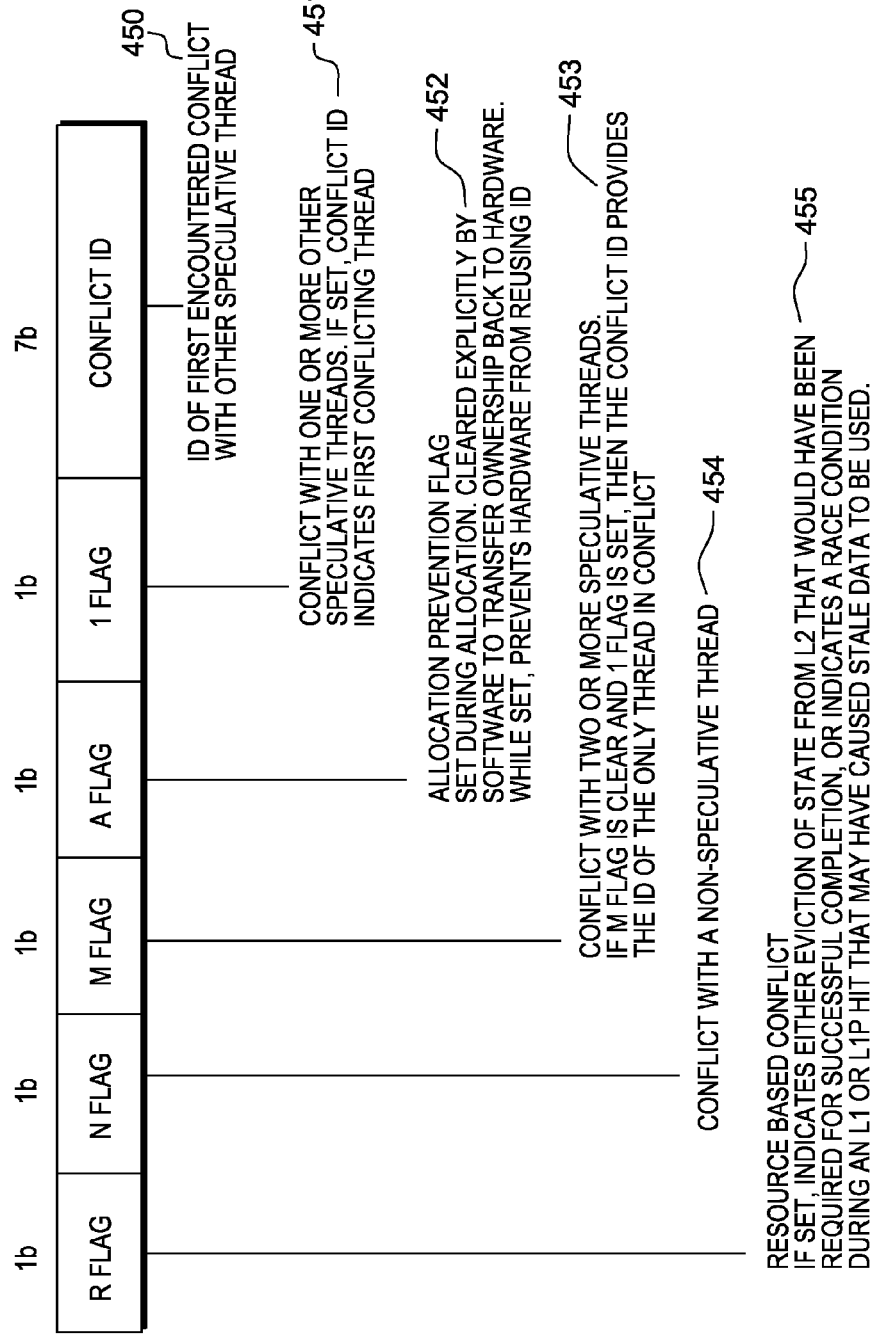

OPERATIONS RELATING TO MEMORY CONSISTENCY

MULTIPROCESSOR SYSTEM WITH MULTIPLE CONCURRENT MODES OF EXECUTION

CROSS-REFERENCE TO RELATED APPLICATIONS

This application is being filed concurrently with U.S. patent application Ser. No. 13/008,531 filed Jan. 18, 2011, which is incorporated herein by reference.

This application claims benefit of the following applications in particular:
61/295,669, filed Jan. 15, 2010 and
61/299,911 filed Jan. 29, 2010,
both for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT".

And the following applications in general:

Benefit of the following applications is claimed and they are also incorporated by reference: U.S. patent application Ser. No. 12/796,411 filed Jun. 8, 2010; U.S. patent application Ser. No. 12/696,780, filed Jan. 29, 2010, now U.S. Pat. No. 8,103,910; U.S. provisional patent application Ser. No. 61/293,611, filed Jan. 8, 2010; U.S. provisional patent application Ser. No. 61/295,669, filed Jan. 15, 2010; U.S. provisional patent application Ser. No. 61/299,911 filed Jan. 29, 2010; U.S. patent application Ser. No. 12/684,367, filed Jan. 8, 2010, now U.S. Pat. No. 8,275,954; U.S. patent application Ser. No. 12/684,172, filed Jan. 8, 2010, now U.S. Pat. No. 8,275,964; U.S. patent application Ser. No. 12/684,190, filed Jan. 8, 2010; U.S. patent application Ser. No. 12/684,496, filed Jan. 8, 2010, now U.S. Pat. No. 8,468,275; U.S. patent application Ser. No. 12/684,429, filed Jan. 8, 2010, now U.S. Pat. No. 8,347,001; U.S. patent application Ser. No. 12/697,799 filed Feb. 1, 2010; U.S. patent application Ser. No. 12/684,738, filed Jan. 8, 2010; U.S. patent application Ser. No. 12/684,860, filed Jan. 8, 2010, now U.S. Pat. No. 8,447,960; U.S. patent application Ser. No. 12/684,174, filed Jan. 8, 2010, now U.S. Pat. No. 8,268,389; U.S. patent application Ser. No. 12/684,184, filed Jan. 8, 2010, now U.S. Pat. No. 8,359,404; U.S. patent application Ser. No. 12/684,852, filed Jan. 8, 2010; U.S. patent application Ser. No. 12/684,642, filed Jan. 8, 2010, now U.S. Pat. No. 8,429,377; U.S. patent application Ser. No. 12/684,804, filed Jan. 8, 2010, now U.S. Pat. No. 8,356,122; U.S. provisional patent application Ser. No. 61/293,237, filed Jan. 8, 2010; U.S. patent application Ser. No. 12/693,972, filed Jan. 26, 2010, now U.S. Pat. No. 8,458,267; U.S. patent application Ser. No. 12/688,747, filed Jan. 15, 2010, now U.S. Pat. No. 8,086,766; U.S. patent application Ser. No. 12/688,773, filed Jan. 15, 2010; U.S. patent application Ser. No. 12/684,776, filed Jan. 8, 2010; U.S. patent application Ser. No. 12/696,825, filed Jan. 29, 2010, now U.S. Pat. No. 8,255,633; U.S. patent application Ser. No. 12/684,693, filed Jan. 8, 2010, now U.S. Pat. No. 8,347,039; U.S. provisional patent application Ser. No. 61/293,494, filed Jan. 8, 2010; U.S. patent application Ser. No. 12/731,796, filed Mar. 25, 2010, now U.S. Pat. No. 8,359,367; U.S. patent application Ser. No. 12/696,746, filed Jan. 29, 2010, now U.S. Pat. No. 8,327,077; U.S. patent application Ser. No. 12/697,015 filed Jan. 29, 2010, now U.S. Pat. No. 8,364,844; U.S. patent application Ser. No. 12/727,967, filed Mar. 19, 2010; U.S. patent application Ser. No. 12/727,984, filed Mar. 19, 2010; U.S. patent application Ser. No. 12/697,043 filed Jan. 29, 2010; U.S. patent application Ser. No. 12/697,175, Jan. 29, 2010; U.S. patent application Ser. No. 12/684,287, filed Jan. 8, 2010, now U.S. Pat. No. 8,370,551; U.S. patent application Ser. No. 12/684,630, filed Jan. 8, 2010, now U.S. Pat. No. 8,312,193; U.S. patent application Ser. No. 12/723,277 filed Mar. 12, 2010, now U.S. Pat. No. 8,521,990; U.S. patent application Ser. No. 12/696,764, filed Jan. 29, 2010, now U.S. Pat. No. 8,412,974; U.S. patent application Ser. No. 12/696,817 filed Jan. 29, 2010; U.S. patent application Ser. No. 12/697,164, filed Jan. 29, 2010, now U.S. Pat. No. 8,527,740; U.S. patent application Ser. No. 12/796,411, filed Jun. 8, 2010; and, U.S. patent application Ser. No. 12/796,389, filed Jun. 8, 2010.

All of the above-listed applications are incorporated by reference herein.

GOVERNMENT CONTRACT

This invention was made with Government support under Contract No.: B554331 awarded by Department of Energy. The Government has certain rights in this invention 21—Speculation and transaction in a system.

BACKGROUND

Herein, several related art documents are listed. This list is not an admission that it would be obvious to combine these documents. This list was only compiled post hoc, after the invention described herein was made.

The following document relates to a type of speculation known as "hardware TLS": Steffan, J. G. 2003 "Hardware Support for Thread-Level Speculation," Doctoral Thesis. UMI Order Number: AAI3159472, Carnegie Mellon University.

The following document relates to a type of speculation known as "Hardware TM:" Hammond, L., Wong, V., Chen, M., Carlstrom, B. D., Davis, J. D., Hertzberg, B., Prabhu, M. K., Wijaya, H., Kozyrakis, C., and Olukotun, K. 2004. "Transactional Memory Coherence and Consistency," In Proceedings of the 31$^{st}$ Annual International Symposium on Computer Architecture (Munchen, Germany, Jun. 19-23, 2004). International Symposium on Computer Architecture. IEEE Computer Society, Washington, D.C., 102.

The following document relates to IDs used for ordering, the IDs being called "timestamps" in this paper:
Renau, J., Tuck, J., Liu, W., Ceze, L., Strauss, K., and Torrellas, J. 2005. "Tasking with out-of-order spawn in TLS chip multiprocessors: microarchitecture and compilation," In Proceedings of the 19th Annual International Conference on Supercomputing (Cambridge, Mass., Jun. 20-22, 2005). ICS '05. ACM, New York, N.Y., 179-188.

The present invention arose in the context of the IBM® BlueGene® multiprocessor environment. This prior environment had some support for speculative execution, but also some limitations on modes of speculative execution. This multiprocessor environment uses an instruction.

SUMMARY

It would be desirable to allow for multiple modes of speculative execution concurrently in a multiprocessor system.

In one embodiment, a computer method includes carrying out operations in a multiprocessor system. The operations include:
running at least one program thread within at least one processor of the system;

recognizing a need for speculative execution in the thread;
allocating a speculation ID to the thread;
managing a pool of speculation IDs in accordance with a plurality of domains, such that IDs are allocated independently for each domain; and
allocating a mode of speculative execution to each domain.

In another embodiment, the operations include
allocating at least one identification number to a thread executing speculatively;
maintaining directory based speculation control responsive to the identification number;
counting instances of use of the identification number being active in the multiprocessor system; and
preventing the identification number from being allocated to a new thread until the counting indicates no instances of use of that ID being active in the system.

In yet another embodiment, a multiprocessor system includes:
a plurality of processors adapted to run threads of program code in parallel in accordance with speculative execution; and
facilities adapted to enable a first thread to operate in accordance with a first mode of speculative execution and a second thread to operate in accordance with a second mode of speculative execution, the first and second modes of speculative execution being different from one another and concurrent.

Objects and advantages will become apparent in the following:

BRIEF DESCRIPTION OF DRAWING

Embodiments will now be described by way of non-limiting example with reference to the following figures:

FIG. 3E shows merging line versions and functioning of the current flag from the basic SRAM.

FIG. 3I-1 is a flowchart showing one aspect of Write after Read ("WAR") conflict checking.

FIG. 3I-2 is a flowchart showing another aspect of WAR conflict checking.

FIG. 4E shows a format for a conflict register.

DETAILED DESCRIPTION

Figure 1:
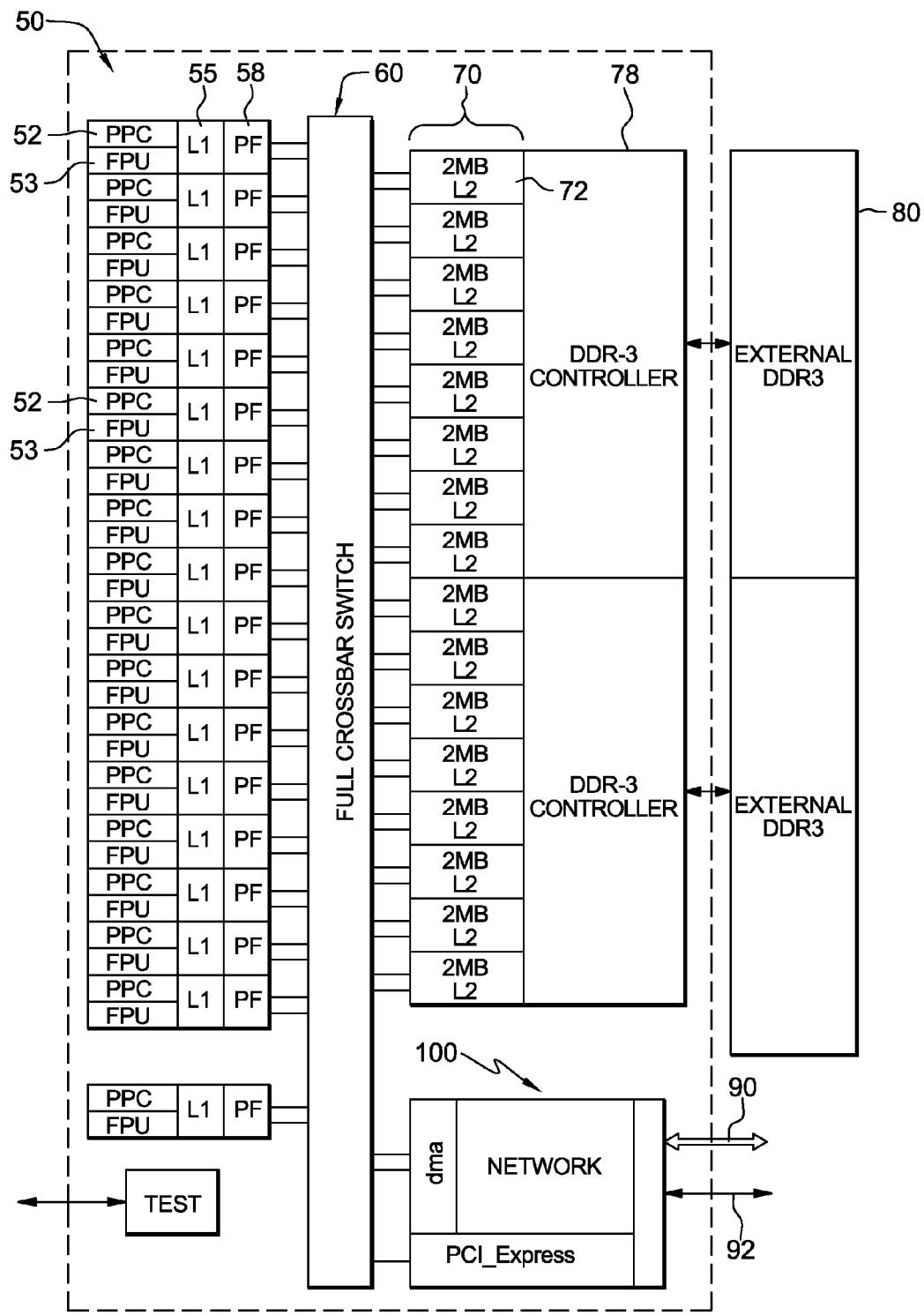
FIG. 1 shows an overview of a nodechip within which the invention may be implemented.

As described herein, the use of the letter "B"—other than as part of a figure number—represents a Byte quantity, while "GB" represents Gigabyte quantities. Throughout this disclosure a particular embodiment of a multi-processor system will be discussed. This discussion includes various numerical values for numbers of components, bandwidths of interfaces, memory sizes and the like. These numerical values are not intended to be limiting, but only examples. One of ordinary skill in the art might devise other examples as a matter of design choice.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, in the A2, there are four threads, numbered zero through three. Throughout a multiprocessor system, such as the nodechip 50 of FIG. 1, 68 software threads can be executed concurrently in the present embodiment.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

Speculation Model

This section describes the underlying speculation ID based memory speculation model, focusing on its most complex usage mode, speculative execution (SE), also referred to as thread level speculation (TLS). When referring to threads, the terms older/younger or earlier/later refer to their relative program order (not the time they actually run on the hardware).

Multithreading Model

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if, because of the concurrent execution, these writes have actually taken place earlier in time.

To sustain the illusion, the memory subsystem, in particular in the preferred embodiment the L2-cache, gives threads private storage as needed. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which threads have read or written the line. A speculative write is not to be written out to main memory.

One situation will break the program-order illusion—if a thread earlier in program order writes to an address that a thread later in program order has already read. The later thread should have read that data, but did not. A solution is to kill the later thread and invalidate all the lines it has written in L2, and to repeat this for all younger threads. On the other hand, without this interference a thread can complete successfully, and its writes can move to external main memory when the line is cast out or flushed.

Not all threads need to be speculative. The running thread earliest in program order can execute as non-speculative and runs conventionally; in particular its writes can go to external main memory. The threads later in program order are speculative and are subject to being killed. When the non-speculative thread completes, the next-oldest thread can be committed and it then starts to run non-speculatively.

The following sections describe a hardware implementation embodiment for a speculation model.

Speculation IDs

Speculation IDs constitute a mechanism for the memory subsystem to associate memory requests with a corresponding task, when a sequential program is decomposed into speculative tasks This is done by assigning an ID at the start of a speculative task to the software thread executing the task and attaching the ID as tag to all requests sent to the memory subsystem by that thread. In SE, a speculation ID should be attached to a single task at a time.

As the number of dynamic tasks can be very large, it is not practical to guarantee uniqueness of IDs across the entire program run. It is sufficient to guarantee uniqueness for all IDs assigned to TLS tasks concurrently present in the memory system.

The BG/Q memory subsystem embodiment implements a set of 128 such speculation IDs, encoded as 7 bit values. On start of a speculative task, a thread requests an ID currently not in use from a central unit, the L2 CENTRAL unit. The thread then uses this ID by storing its value in a core-local register that tags the ID on all requests sent to the L2-cache.

After a thread has terminated, the changes associated with its ID are either committed, i.e., merged with the persistent main memory state, or they are invalidated, i.e., removed from the memory subsystem, and the ID is reclaimed for further allocation. But before a new thread can use the ID, no valid lines with that thread ID may remain in the L2. It is not necessary for the L2 to identify and mark these lines immediately because the pool of usable IDs is large. Therefore, cleanup is gradual.

Life Cycle of a Speculation ID

Figure 5:
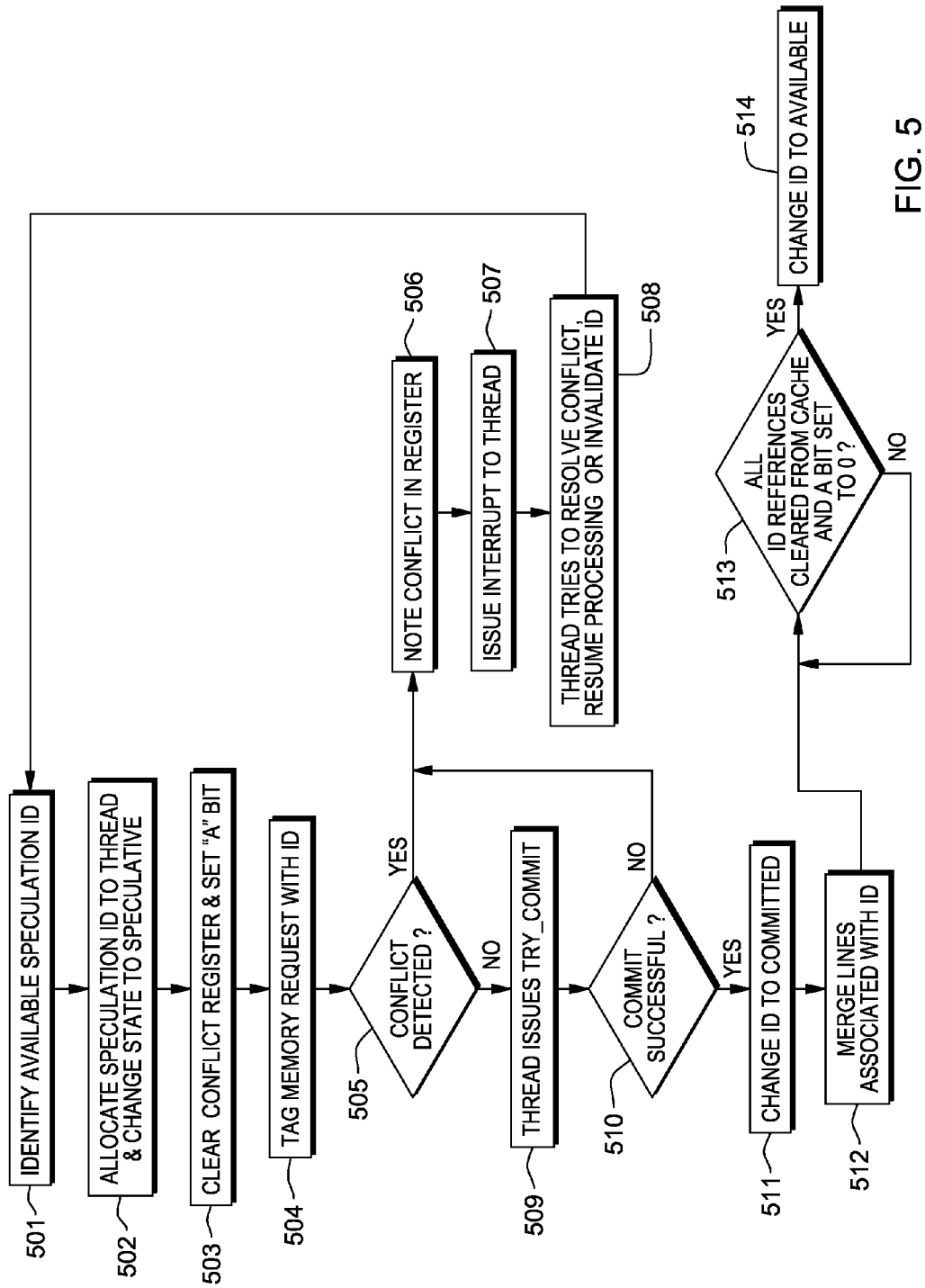
FIG. 5 is a flowchart of the life cycle of a speculation ID.

FIG. 5 illustrates the life cycle of a speculation ID. When a speculation ID is in the available state at 501, it is unused and ready to be allocated. When a thread requests an ID allocation from L2 CENTRAL, the ID selected by L2 CENTRAL changes state to speculative at 502, its conflict register is cleared and its A-bit is set at 503.

The thread starts using the ID with tagged memory requests at 504. Such tagging may be implemented by the runtime system programming a register to activate the tagging. The application may signal the runtime system to do so, especially in the case of TM. If a conflict occurs at 505, the conflict is noted in the conflict register of FIG. 4E at 506 and the thread is notified via an interrupt at 507. The thread can try to resolve the conflict and resume processing or invalidate its ID at 508. If no conflict occurs until the end of the task per 505, the thread can try to commit its ID by issuing a try_commit, a table of functions appears below, request to L2 CENTRAL at 509. If the commit is successful at 510, the ID changes to the committed state at 511. Otherwise, a conflict must have occurred and the thread has to take actions similar to a conflict notification during the speculative task execution.

After the ID state change from speculative to committed or invalid, the L2 slices start to merge or invalidate lines associated with the ID at 512. More about merging lines will be described with reference to FIGS. 3E and 12 below. The ID does not switch to available until at 514 all references to the ID have been cleared from the cache and software has explicitly cleared the A-bit per 513.

In addition to the SE use of speculation, the proposed system can support two further uses of memory speculation: Transactional Memory ("TM"), and Rollback. These uses are referred to in the following as modes.

TM occurs in response to a specific programmer request. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation". Alternatively, the programmer may put in a request to the runtime system for a domain to be allocated to TM execution. This request will be conveyed by the runtime system via the operating system to the hardware, so that modes and IDs can be allocated. When the section ends, the program will make another call that ultimately signals the hardware to do conflict checking and reporting. Reporting means in this context: provide conflict details in the conflict register and issue an interrupt to the affected thread. The PowerPC architecture has an instruction type known as larx/stcx. This instruction type can be implemented as a special case of TM. The larx/stcx pair will delimit a memory access request to a single address and set up a program section that ends with a request to check whether the memory access request was successful or not. More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure. TM is generally used for only a subset of an application program, with program sections before and after executing in speculative mode.

Rollback occurs in response to "soft errors," normally these errors occur in response to cosmic rays or alpha particles from solder balls.

Referring now to FIG. 1, there is shown an overall architecture of a multiprocessor computing node 50 implemented in a parallel computing system in which the present embodiment may be implemented. The compute node 50 is a single chip ("nodechip") based on PowerPC cores, though the architecture can use any cores, and may comprise one or more semiconductor chips.

More particularly, the basic nodechip 50 of the multiprocessor system illustrated in FIG. 1 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The 17$^{th}$ core is configurable to carry out system tasks, such as
  reacting to network interface service interrupts, distributing network packets to other cores;
  taking timer interrupts
  reacting to correctable error interrupts,
  taking statistics
  initiating preventive measures
  monitoring environmental status (temperature), throttle system accordingly.
In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2.

Each FPU 53 associated with a core 52 has a data path to the L1-cache 55 of the CORE, allowing it to load or store from or into the L1-cache 55. The terms "L1" and "L1D" will both be used herein to refer to the L1 data cache.

Each core 52 is directly connected to a supplementary processing agglomeration 58, which includes a private prefetch unit. For convenience, this agglomeration 58 will be referred to herein as "L1P"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be illustrated herein as being part of the agglomeration labeled "L1P." This is a matter of drawing organization, not of substance. Some of the additional processing power of this L1P group includes write combining. The L1P group also accepts, decodes and dispatches all requests sent out by the core 52.

By implementing a direct memory access ("DMA") engine referred to herein as a Messaging Unit ("MU") such as MU 100, with each MU including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU The system node employs or is associated and interfaced with a 8-16 GB memory/node, also referred to herein as "main memory."

The term "multiprocessor system" is used herein. With respect to the present embodiment this term can refer to a nodechip or it can refer to a plurality of nodechips linked together. In the present embodiment, however, the management of speculation is conducted independently for each nodechip. This might not be true for other embodiments, without taking those embodiments outside the scope of the claims.

The compute nodechip implements a direct memory access engine DMA to offload the network interface. It transfers blocks via three switch master ports between the L2-cache slices 70 (FIG. 1). It is controlled by the cores via memory mapped I/O access through an additional switch slave port. There are 16 individual slices, each of which is assigned to store a distinct subset of the physical memory lines. The actual physical memory addresses assigned to each cache slice is configurable, but static. The L2 will have a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 will have ports, for instance a 256 b wide read data port, a 128 b wide write data port, and a request port. Ports may be shared by all processors through the crossbar switch 60.

Figure 1A:
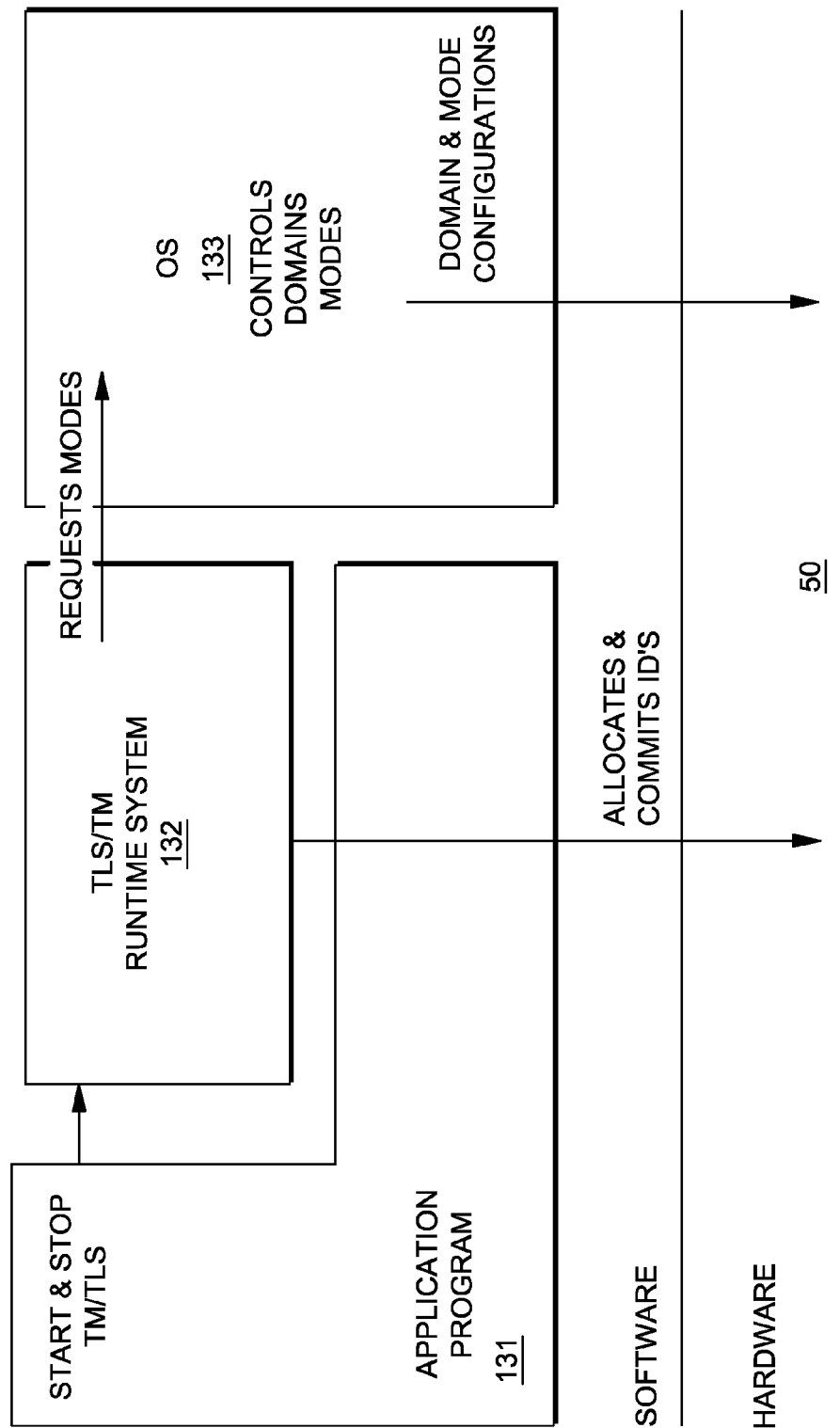
FIG. 1A shows some software running in a distributed fashion on the nodechip.
Figure 4:
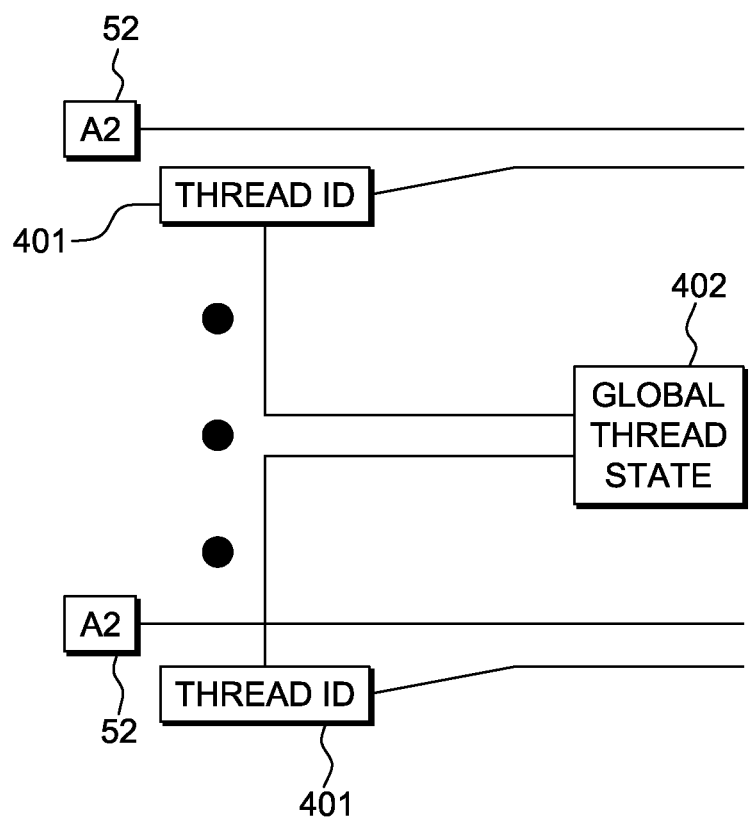
FIG. 4 shows a schematic of global thread management.

FIG. 1A shows some software running in a distributed fashion, distributed over the cores of node 50. An application program is shown at 131. If the application program requests TLS or TM, a runtime system 132 will be invoked. This runtime system is particularly to manage TM and TLS execution and can request domains of IDs from the operating system 133. The runtime system can also request allocation of and commits of IDs. The runtime system includes a subroutine that can be called by threads and that maintains a data structure for keeping track of calls for speculative execution from threads. The operating system configures domains and modes of execution. "Domains" in this context are numerical groups of IDs that can be assigned to a mode of speculation. In the present embodiment, an L2 central unit will perform functions such as defining the domains, defining the modes for the domains, allocating speculative ids, trying to commit them, sending interrupts to the cores in case of conflicts, and retrieving conflict information. FIG. 4 shows schematically a number of CORE processors 52. Thread IDs 401 are assigned centrally and a global thread state 402 is maintained.

Figure 1B:
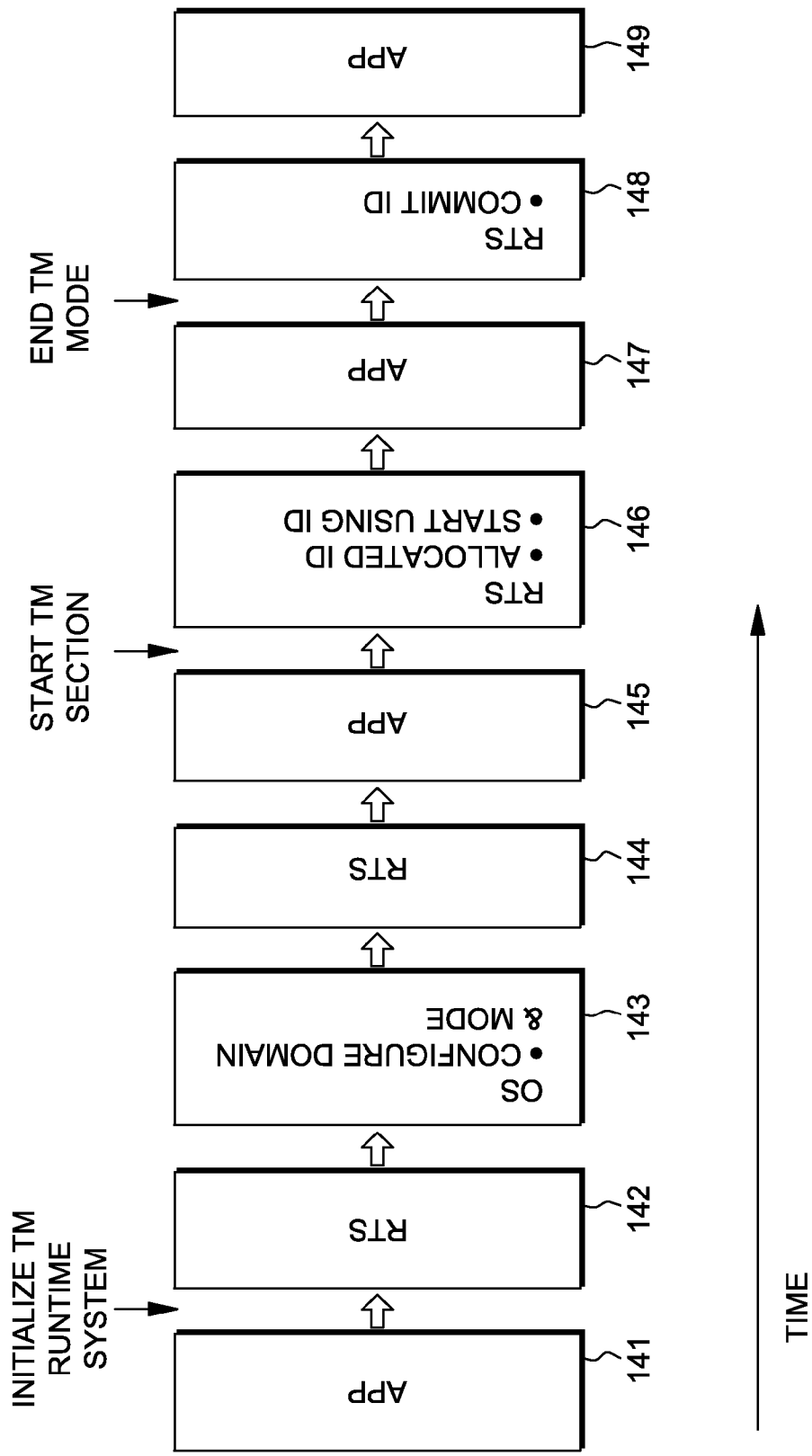
FIG. 1B shows a timing diagram with respect to TM type speculative execution.

FIG. 1B shows a timing diagram explaining how TM execution might work on this system. At 141 the program starts executing. At the end of block 141, a call for TM is made. In 142 the run time system receives this request and conveys it to the operating system. At 143, the operating system confirms the availability of the mode. The operating system can accept, reject, or put on hold any requests for a mode. The confirmation is made to the runtime system at 144. The confirmation is received at the application program at 145. If there had been a refusal, the program would have had to adopt a different strategy, such as serialization or waiting for the domain with the desired mode to become available. Because the request was accepted, parallel sections can start running at the end of 145. The runtime system gets speculative IDs from the hardware at 146 and transmits them to the application program at 147, which then uses them to tag memory accesses. The program knows when to finish speculation at the end of 147. Then the run time system asks for the ID to commit at 148. Any conflict information can be transmitted back to the application program at 149, which then may try again or adopt other strategies. If there is a conflict and an interrupt is raised by the L2 central, the L2 will send the interrupt to the hardware thread that was using the ID. This hardware thread then has to figure out, based on the state the runtime system is in and the state the L2 central provides indicating a conflict, what to do in order to resolve the conflict. For example, it might execute the transactional memory section again which causes the software to jump back to the start of the transaction.

If the hardware determines that no conflict has occurred, the speculative results of the associated thread can be made persistent.

In response to a conflict, trying again may make sense where another thread completed successfully, which may allow the current thread to succeed. If both threads restart, there can be a "lifelock," where both keep failing over and over. In this case, the runtime system may have to adopt other strategies like getting one thread to wait, choosing one transaction to survive and killing others, or other strategies, all of which are known in the art.

Figure 1C:
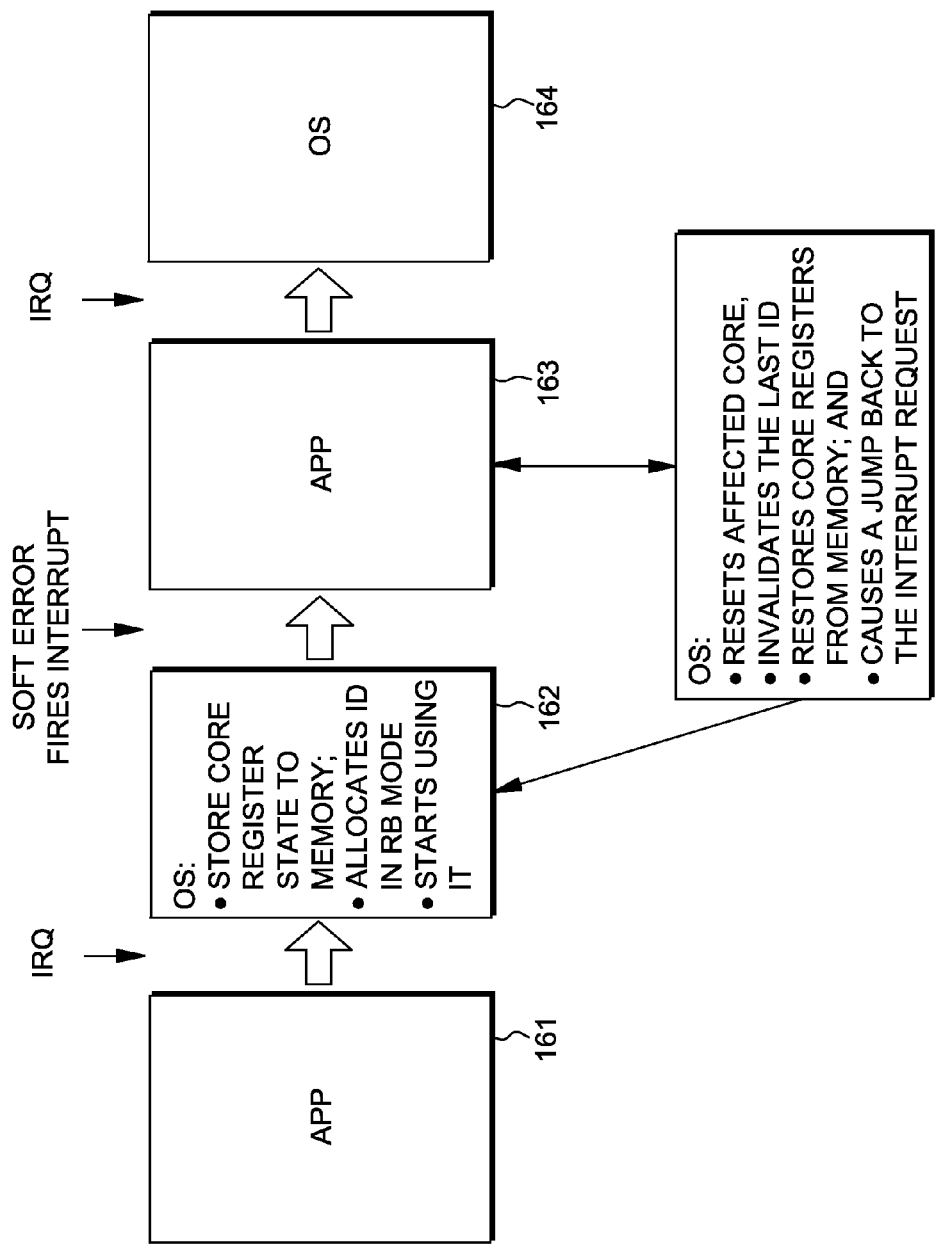
FIG. 1C shows a timing diagram with respect to Rollback execution.

FIG. 1C shows a timing diagram for rollback mode. More about the implementation of rollback is to be found in the co-pending application Ser. No. 12/696,780, which is incorporated herein by reference. In the case of rollback, an application program is running at 161 without knowing that any speculative execution is contemplated. The operating system requests an interrupt immediately after 161. At the time of this interrupt, it stores a snapshot at 162 of the core register state to memory; allocates an ID in rollback mode; and starts using that ID in accessing memory. In the case of a soft error, during the subsequent running of the application program 163, the operating system receives an interrupt indicating an invalid state of the processor, resets the affected core, invalidates the last speculation ID, restores core registers from memory, and jumps back to the point where the snapshot was taken. If no soft error occurs, the operating system at the end of 163 will receive another interrupt and take another snapshot at 164.

Once an ID is committed, the actions taken by the thread under that ID become irreversible.

In the current embodiment, a hardware thread can only use one speculation ID at a time and that ID can only be configured to one domain of IDs. This means that if TM or TLS is invoked, which will assign an ID to the thread, then rollback cannot be used. In this case, the only way of recovering from a soft error might be to go back to system states that are stored to disk on a more infrequent basis. It might be expected in a typical embodiment that a rollback snapshot might be taken on the order of once every millisecond, while system state might be stored to disk only once every hour or two. Therefore rollback allows for much less work to be lost as a result of a soft error. Soft errors increase in frequency as chip density increases. Executing in TLS or TM mode therefore entails a certain risk.

Generally, recovery from failure of any kind of speculative execution in the current embodiment relates to undoing changes made by a thread. If a soft error occurred that did not relate to a change that the thread made, then it may nevertheless be necessary to go back to the snapshot on the disk.

Figure 1D:
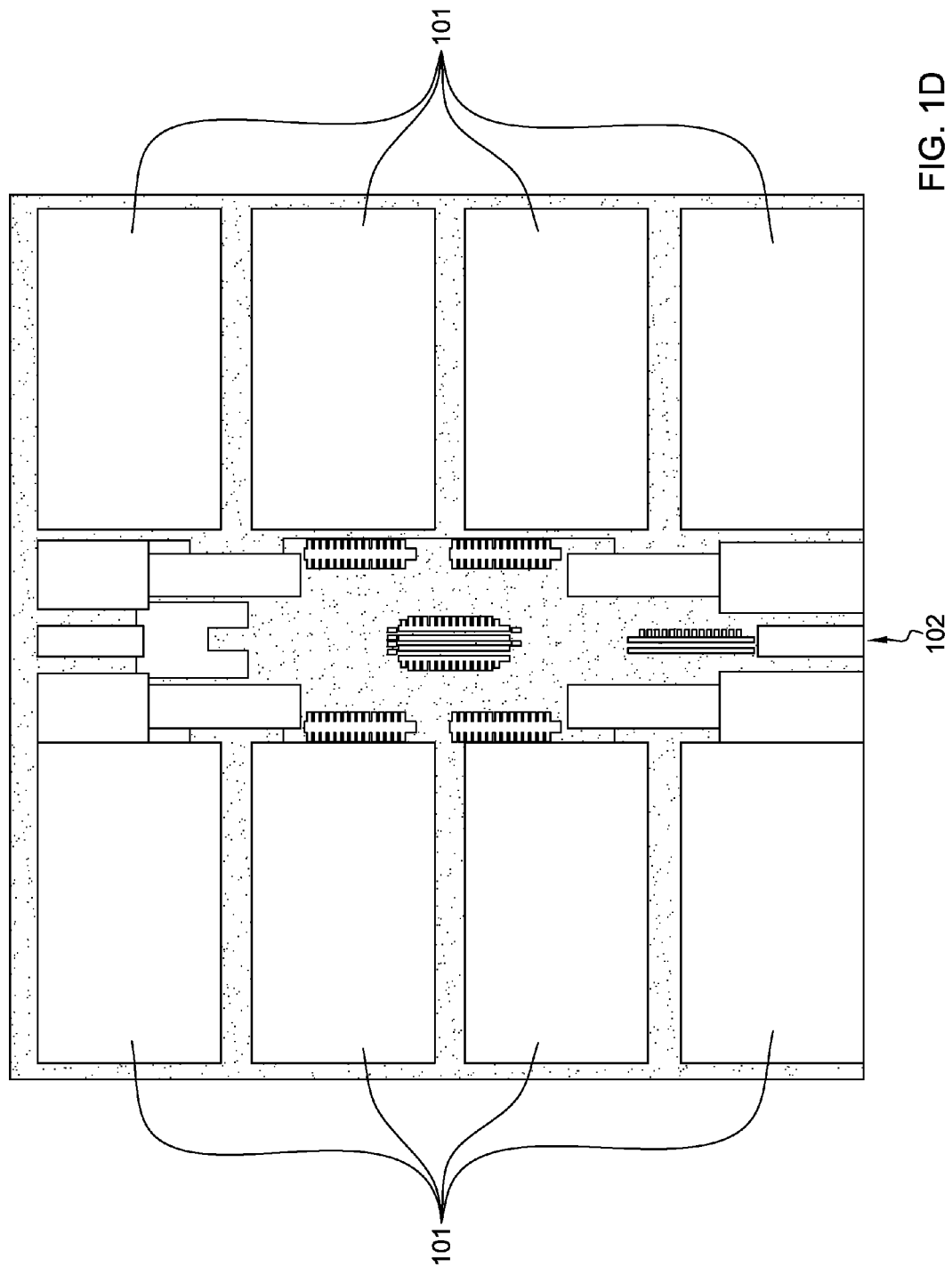
FIG. 1D shows a map of a cache slice.

As shown in FIG. 1, a 32 MB shared L2 (see also FIG. 2) is sliced into 16 units 70, each connecting to a slave port of the switch 60. The L2 slice macro area shown in FIG. 1D is dominated by arrays. The 8 256 KB eDRAM macros 101 are stacked in two columns, each 4 macros tall. In the center 102, the directory Static Random Access Memories ("SRAMs") and the control logic are placed.

Figure 2:
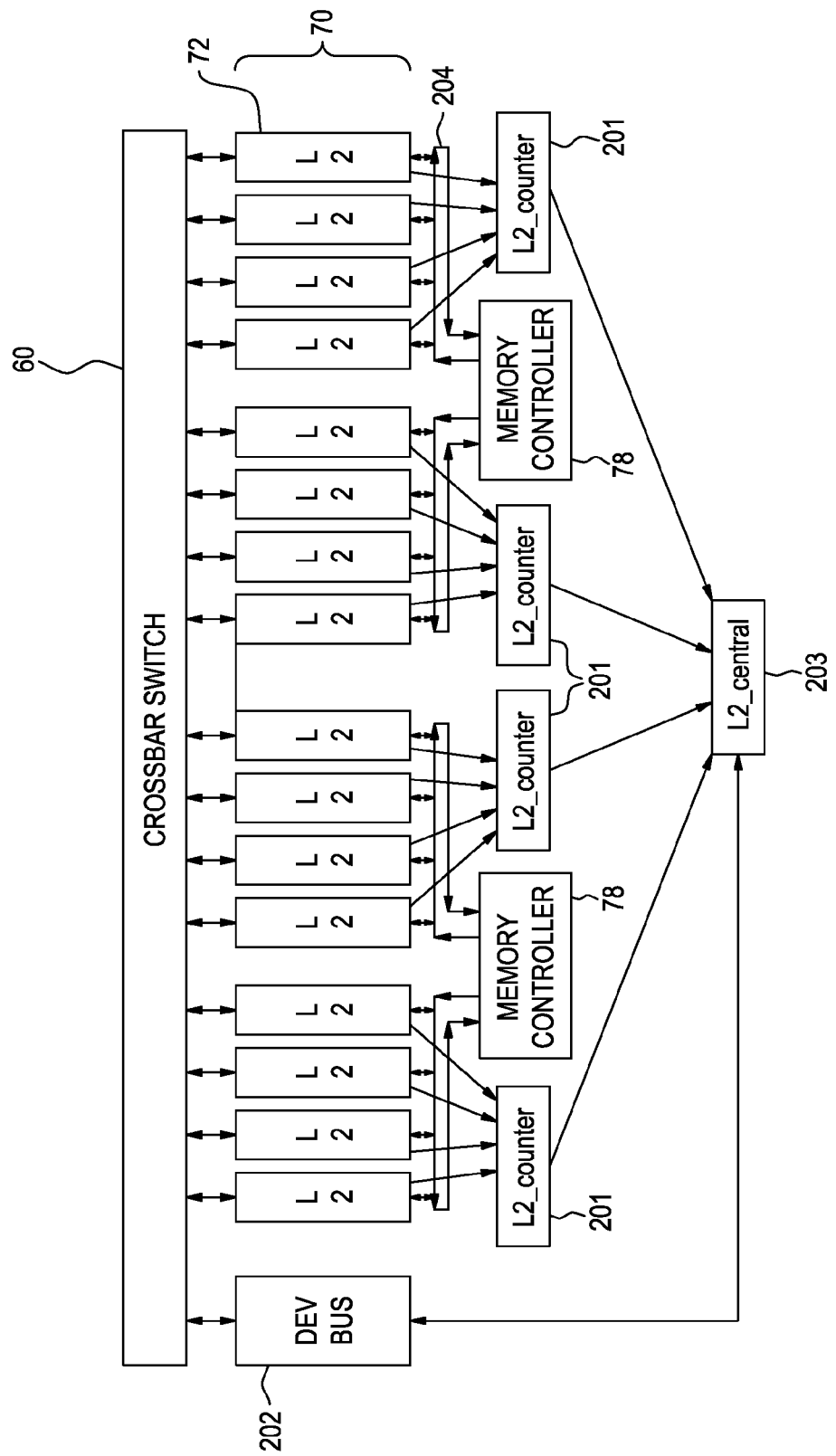
FIG. 2 shows an overview of the L2 cache with thread management circuitry.

FIG. 2 shows more features of the L2. In FIG. 2, reference numerals repeated from FIG. 1 refer to the same elements as in the earlier figure. Added to this diagram with respect to FIG. 1 are L2 counters 201, Device Bus ("DEV BUS") 202, and L2 CENTRAL. 203. Groups of 4 slices are connected via a ring, e.g. 204, to one of the two DDR3 SDRAM controllers 78.

Figure 2A:
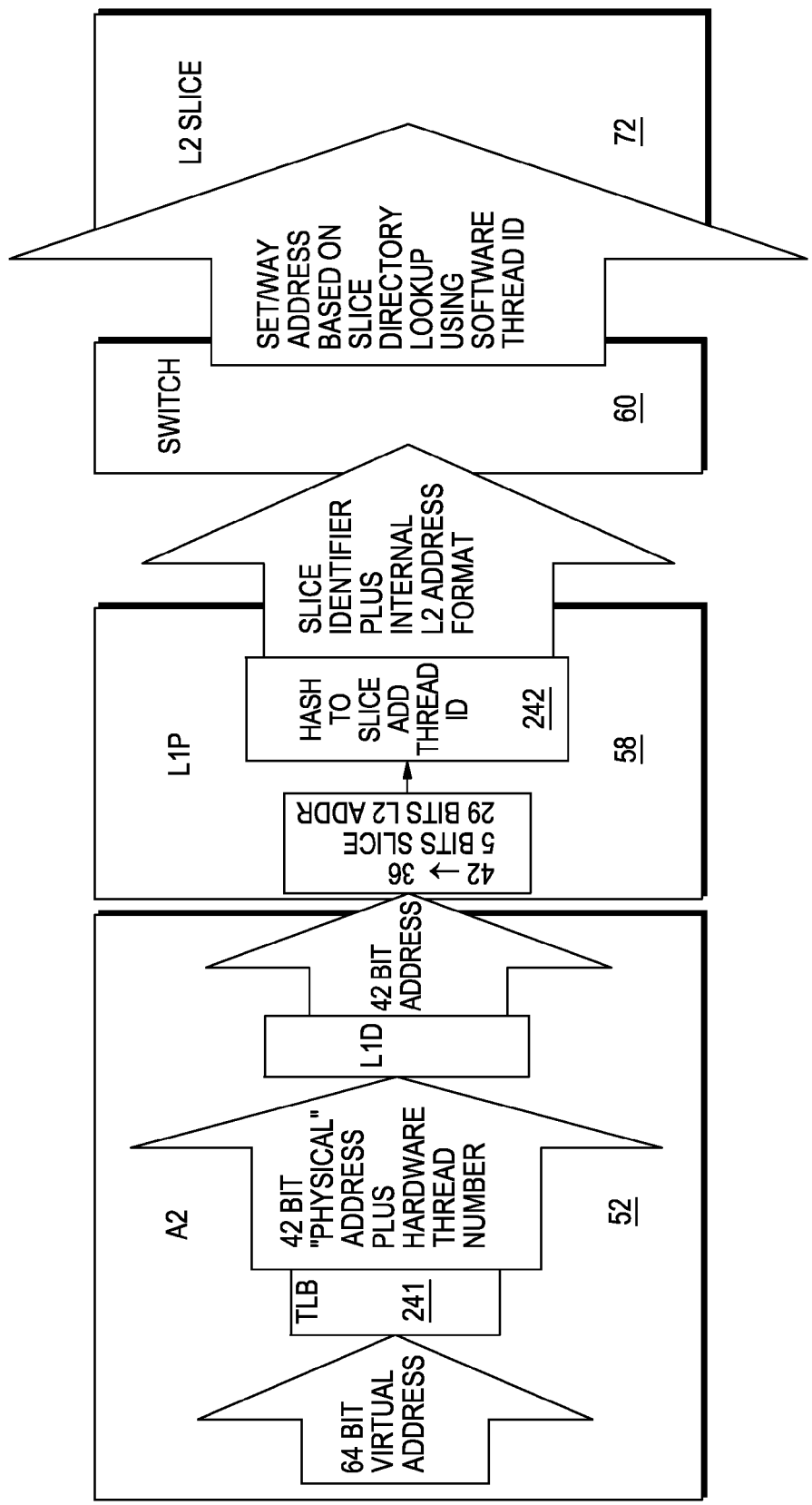
FIG. 2A is a conceptual diagram showing different address representations at different points in a communications pathway.
Figure 2B:
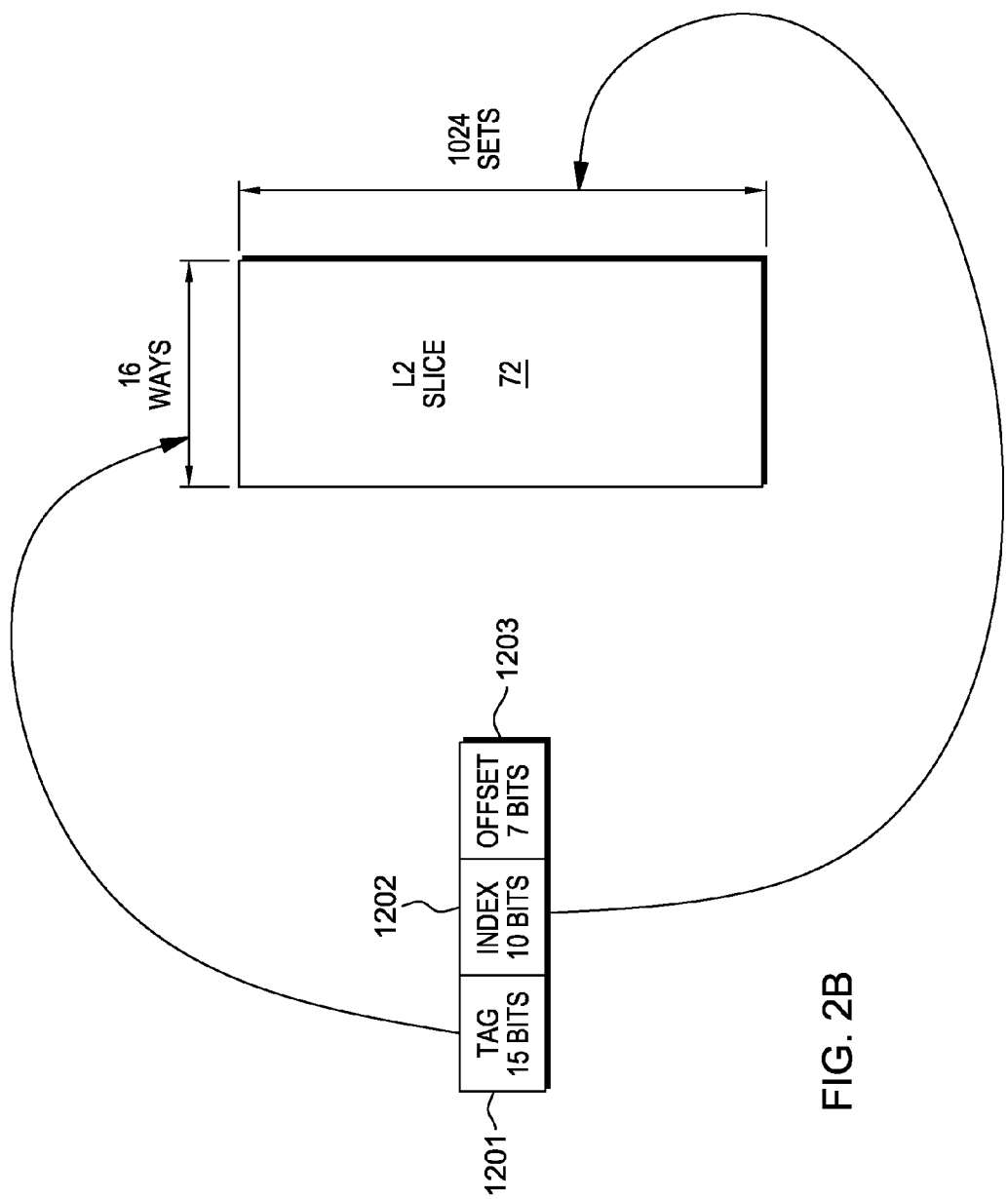
FIG. 2B shows address formatting used by the switch to locate the slice

FIG. 2A shows various address versions across a memory pathway in the nodechip 50. One embodiment of the core 52, uses a 64 bit virtual address as part of instructions in accordance with the PowerPC architecture. In the TLB 241, that address is converted to a 42 bit "physical" address that actually corresponds to 64 times the size of the main memory 80, so it includes extra bits for thread identification information. The term "physical" is used loosely herein to contrast with the more elaborate addressing including memory mapped i/o that is used in the PowerPC core 52. The address portion will have the canonical format of FIG. 2B, prior to hashing, with a tag 1201 that corresponds to a way, an index 1202 that corresponds to a set, and an offset 1203 that corresponds to a location within a line. The addressing varieties shown here, with respect to the commercial embodiment, are intended to be used for the data pathway of the cores. The instruction pathway is not shown here. After arriving at the L1P, the address is converted to 36 bits.

Address scrambling tries to distribute memory accesses across L2-cache slices and within L2-cache slices across sets (congruence classes). Assuming a 64 GB main memory address space, a physical address dispatched to the L2 has 36 bits, numbered from 0 (MSb) to 35 (LSb) (a(0 to 35)).

The L2 stores data in 128 B wide lines, and each of these lines is located in a single L2-slice and is referenced there via a single directory entry. As a consequence, the address bits 29 to 35 only reference parts of an L2 line and do not participate in L2 or set selection.

To evenly distribute accesses across L2-slices for sequential lines as well as larger strides, the remaining address bits are hashed to determine the target slice. To allow flexible configurations, individual address bits can be selected to determine the slice as well as an XOR hash on an address can be used: The following hashing is used in the present embodiment:

$L2$ slice:=('0000' & $a(0)$)xor $a(1$ to $4)$xor $a(5$ to $8)$xor $a(9$ to $12)$xor $a(13$ to $16)$xor $a(17$ to $20)$xor $a(21$ to $24)$xor $a(25$ to $28)$ For each of the slices, 25 address bits are a sufficient reference to distinguish L2 cache lines mapped to that slice.

Each L2 slice holds 2 MB of data or 16K cache lines. At 16-way associativity, the slice has to provide 1024 sets, addressed via 10 address bits. The different ways are used to store different addresses mapping to the same set as well as for speculative results associated with different threads or combinations of threads.

Again, even distribution across set indices for unit and non-unit strides is achieved via hashing, to wit:

Set index:=("00000" & $a(0$ to $4)$)xor $a(5$ to $14)$xor $a(15$ to $24)$.

To uniquely identify a line within the set, using a(0 to 14) is sufficient as a tag.

Thereafter, the switch provides addressing to the L2 slice in accordance with an address that includes the set and way and offset within a line, as shown in FIG. 2A. Each line has 16 ways.

L2 as Point of Coherence

In this embodiment, the L2 Cache provides the bulk of the memory system caching on the BQC chip. To reduce main memory accesses, the L2 caches serve as the point of coherence for all processors. This function includes generating L1 invalidations when necessary. Because the L2 caches are inclusive of the L1s, they can remember which processors could possibly have a valid copy of every line. Memory consistency is enforced by the L2 slices by means of multi-casting selective L1 invalidations, made possible by the fact that the L1s operate in write-through mode and the L2s are inclusive of the L1s.

Per the article on "Cache Coherence" in Wikipedia, there are several ways of monitoring speculative execution to see if some resource conflict is occurring, e.g.

Directory-based coherence: In a directory-based system, the data being shared is placed in a common directory that maintains the coherence between caches. The directory acts as a filter through which the processor must ask permission to load an entry from the primary memory to its cache. When an entry is changed the directory either updates or invalidates the other caches with that entry.

Snooping is the process where the individual caches monitor address lines for accesses to memory locations that they have cached. When a write operation is observed to a location that a cache has a copy of, the cache controller invalidates its own copy of the snooped memory location.

Snarfing is where a cache controller watches both address and data in an attempt to update its own copy of a memory location when a second master modifies a location in main memory. When a write operation is observed to a location that a cache has a copy of, the cache controller updates its own copy of the snarfed memory location with the new data.

The prior version of the IBM® BluGene® processor used snoop filtering to maintain cache coherence. In this regard, the following patent is incorporated by reference: U.S. Pat. No. 7,386,685, issued 10. Jun. 2008

The embodiment discussed herein uses directory based coherence.

Figure 3:
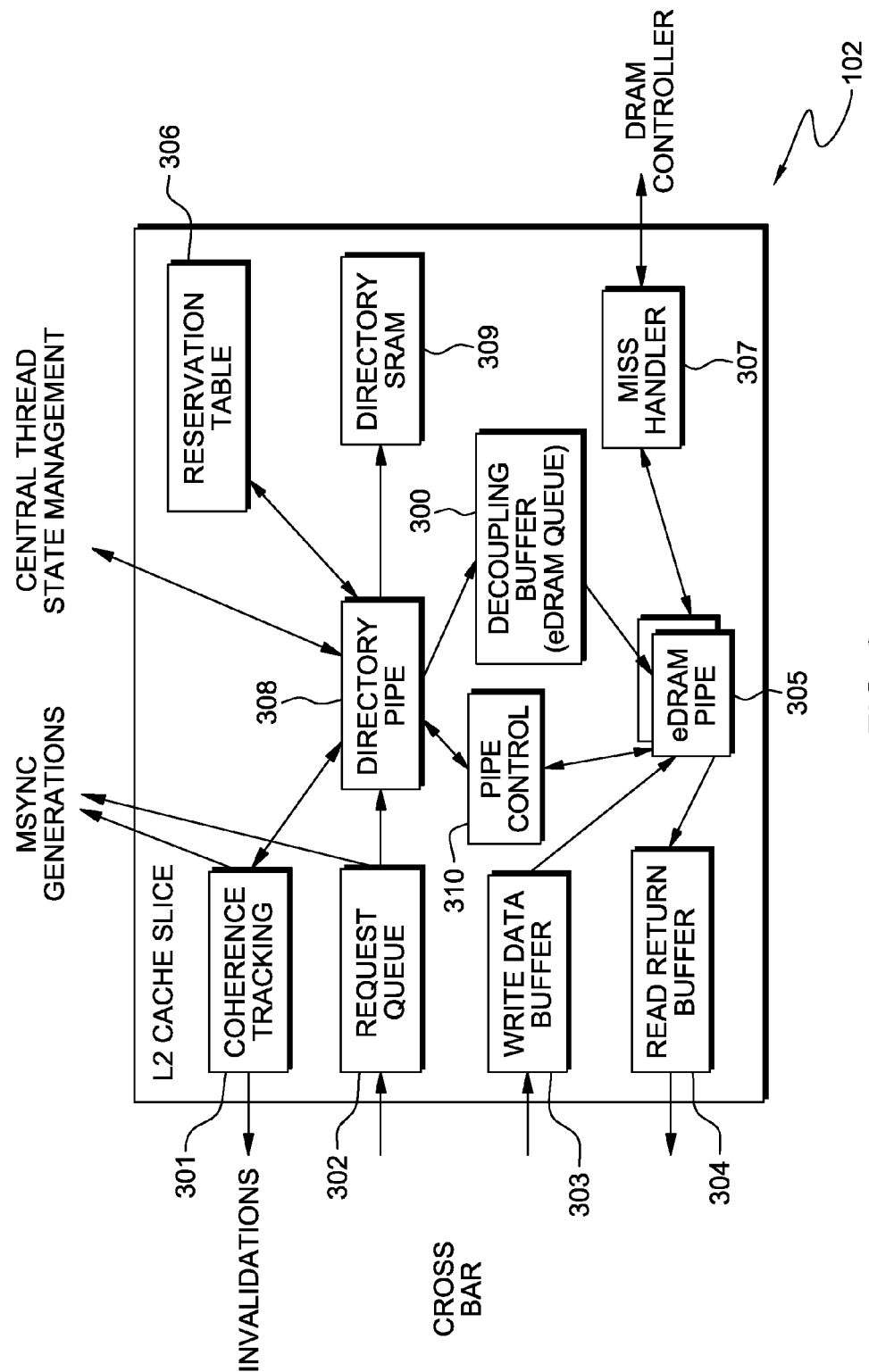
FIG. 3 is a schematic of the control unit of an L2 slice.

FIG. 3 shows features of an embodiment of the control section 102 of a cache slice 72.

Coherence tracking unit 301 issues invalidations, when necessary.

The request queue 302 buffers incoming read and write requests. In this embodiment, it is 16 entries deep, though other request buffers might have more or less entries. The addresses of incoming requests are matched against all pending requests to determine ordering restrictions. The queue presents the requests to the directory pipeline 308 based on ordering requirements.

The write data buffer 303 stores data associated with write requests. This embodiment has a 16 B wide data interface to the switch 60 and stores 16 16 B wide entries. Other sizes might be devised by the skilled artisan as a matter of design choice. This buffer passes the data to the eDRAM pipeline 305 in case of a write hit or after a write miss resolution. The eDRAMs are shown at 101 in FIG. 1D.

The directory pipeline 308 accepts requests from the request queue 302, retrieves the corresponding directory set from the directory SRAM 309, matches and updates the tag information, writes the data back to the SRAM and signals the outcome of the request (hit, miss, conflict detected, etc.). Operations illustrated at FIGS. 3F, 3G, 3H, 3I-1, and 3I-2 are conducted within the directory pipeline 308.

In parallel,

⇒ each request is also matched against the entries in the miss queue at 307 and double misses are signaled ⇒ each larx, stcx and other store are handed off to the reservation table 306 to track pending reservations and resolve conflicts;

⇒ back-to-back load-and-increments to the same location are detected and merged into one directory access and are controlling back-to-back increment operations inside the eDRAM pipeline 305.

The L2 implements two eDRAM pipelines 305 that operate independently. They may be referred to as eDRAM bank 0 and eDRAM bank 1. The eDRAM pipeline controls the eDRAM access and the dataflow from and to this macro. If writing only subcomponents of a doubleword or for load-and-increment or store-add operations, it is responsible to schedule the necessary Read Modify Write ("RMW") cycles and provide the dataflow for insertion and increment.

The read return buffer 304 buffers read data from eDRAM or the memory controller 78 and is responsible for scheduling the data return using the switch 60. In this embodiment it has a 32 B wide data interface to the switch. It is used only as a staging buffer to compensate for backpressure from the switch. It is not serving as a cache.

The miss handler 307 takes over processing of misses determined by the directory. It provides the interface to the DRAM controller and implements a data buffer for write and read return data from the memory controller.

The reservation table 306 registers reservation requests, decides whether a STWCX can proceed to update L2 state and invalidates reservations based on incoming stores.

Also shown are a pipeline control unit 310 and EDRAM queue decoupling buffer 300. The L2 implements a multitude of decoupling buffers for different purposes.

The Request queue is an intelligent decoupling buffer (with reordering logic), allowing to receive requests from the switches even if the directory pipe is blocked The write data buffer accepts write data from the switch even if the eDRAM pipe is blocked or the target location in the eDRAM is not yet known The Coherence tracking implements two buffers: One decoupling the directory lookup sending to it requests from the internal coherence SRAM lookup pipe. And one decoupling the SRAM lookup results from the interface to the switch.

The miss handler implements one from the DRAM controller to the eDRAM and one from the eDRAM to the DRAM controller There are more, almost every little subcomponent that can block for any reason is connected via a decoupling buffer to the unit feeding requests to it.

Figure 3A:
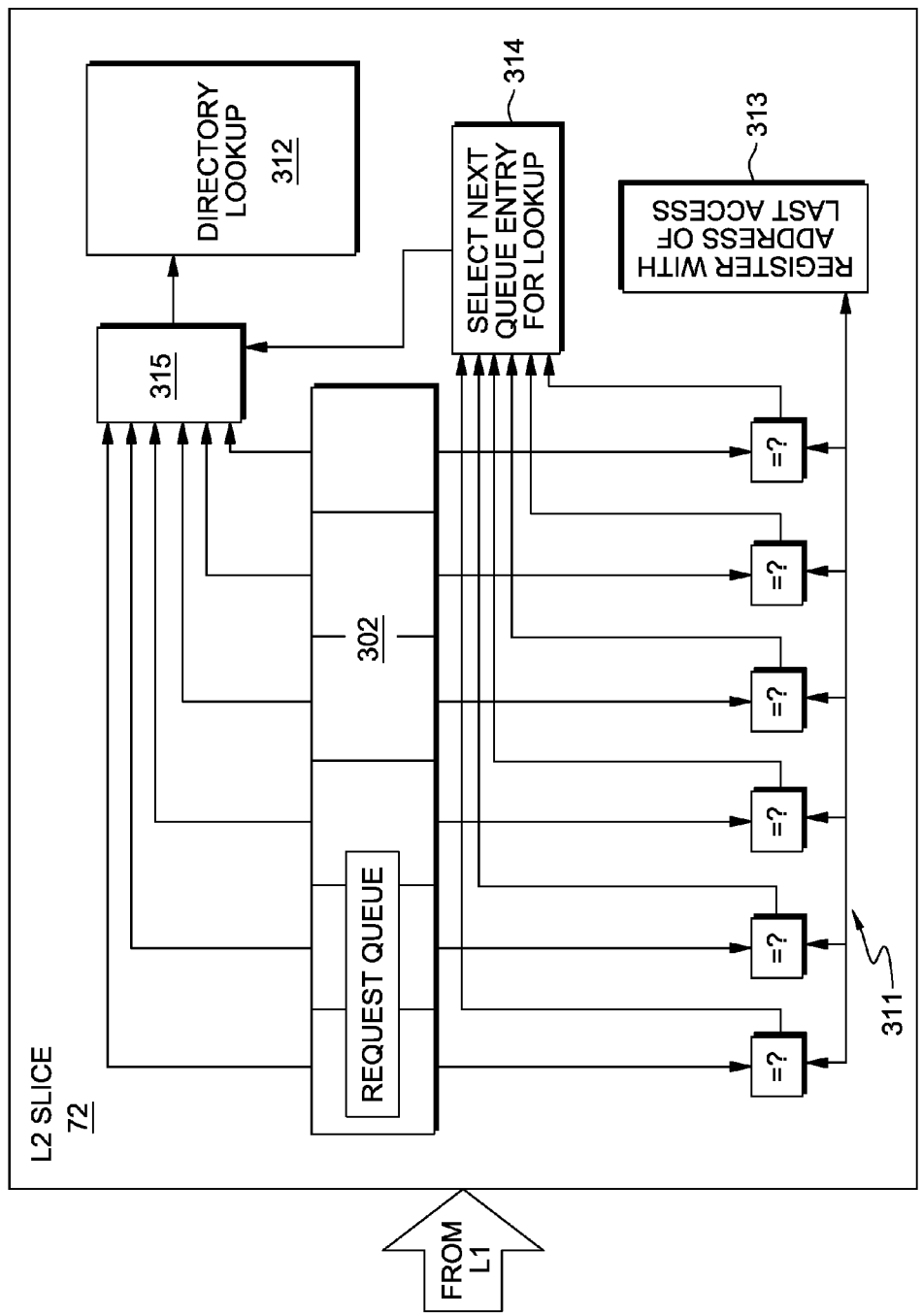
FIG. 3A shows a request queue and retaining data associated with a previous memory access request.

FIG. 3A. The L2 slice 72 includes a request queue 302. At 311, a cascade of modules tests whether pending memory access requests will require data associated with the address of a previous request, the address being stored at 313. These tests might look for memory mapped flags from the L1 or for some other identification. A result of the cascade 311 is used to create a control input at 314 for selection of the next queue entry for lookup at 315, which becomes an input for the directory look up module 312.

Figure 3B:
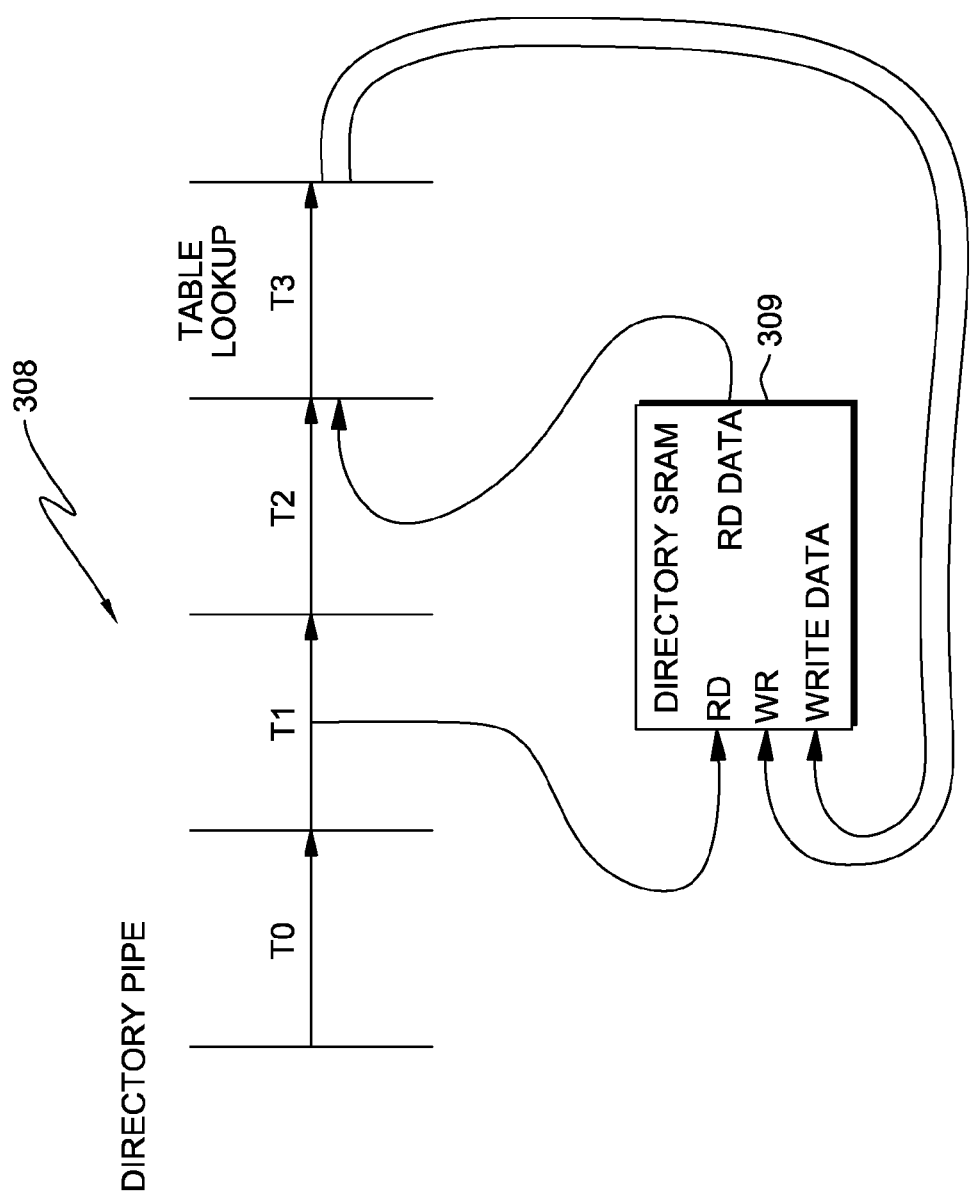
FIG. 3B shows interaction between the directory pipe and directory SRAM.
Figure 3C:
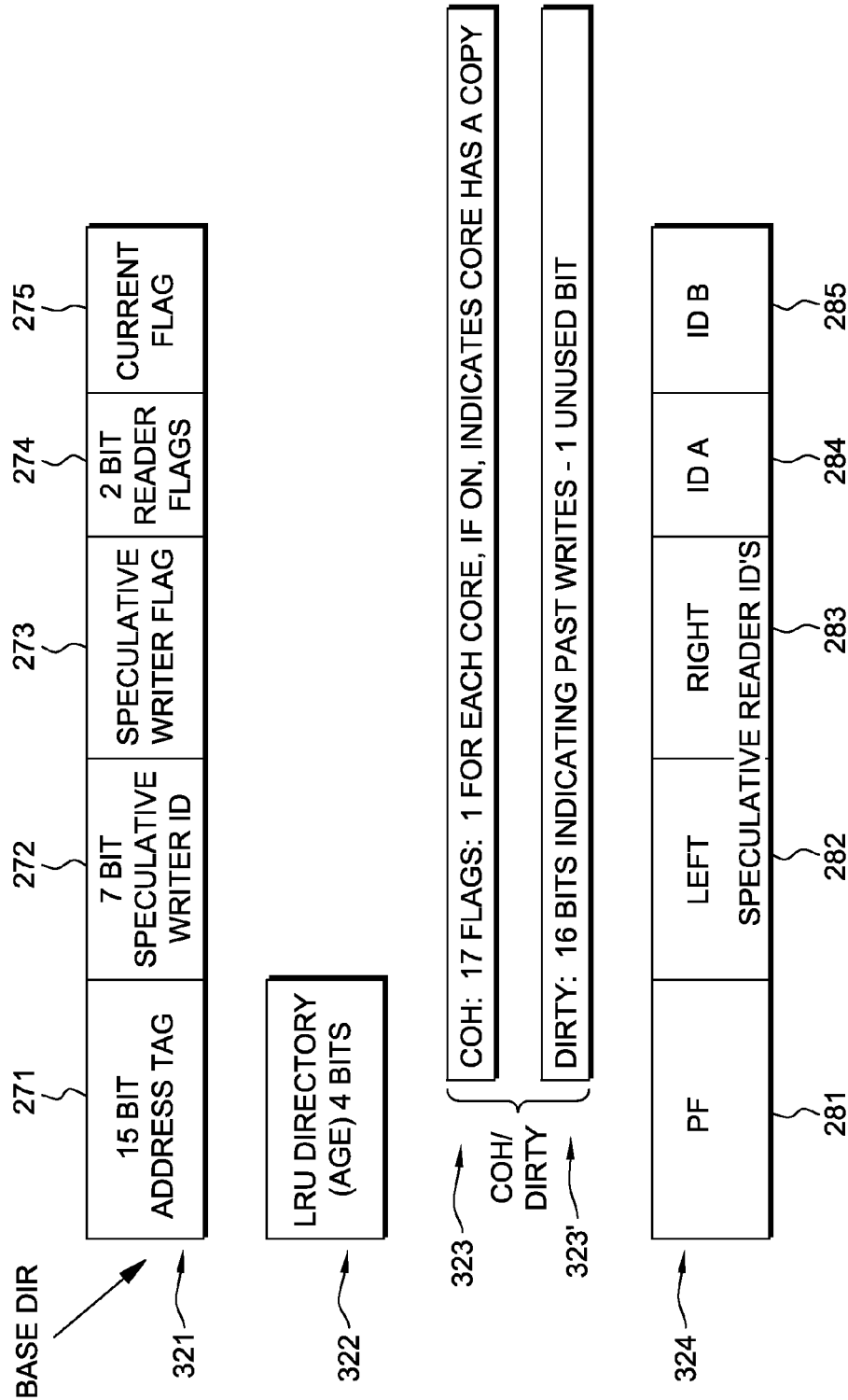
FIG. 3C shows structure of the directory SRAM 309.
Figure 3D:
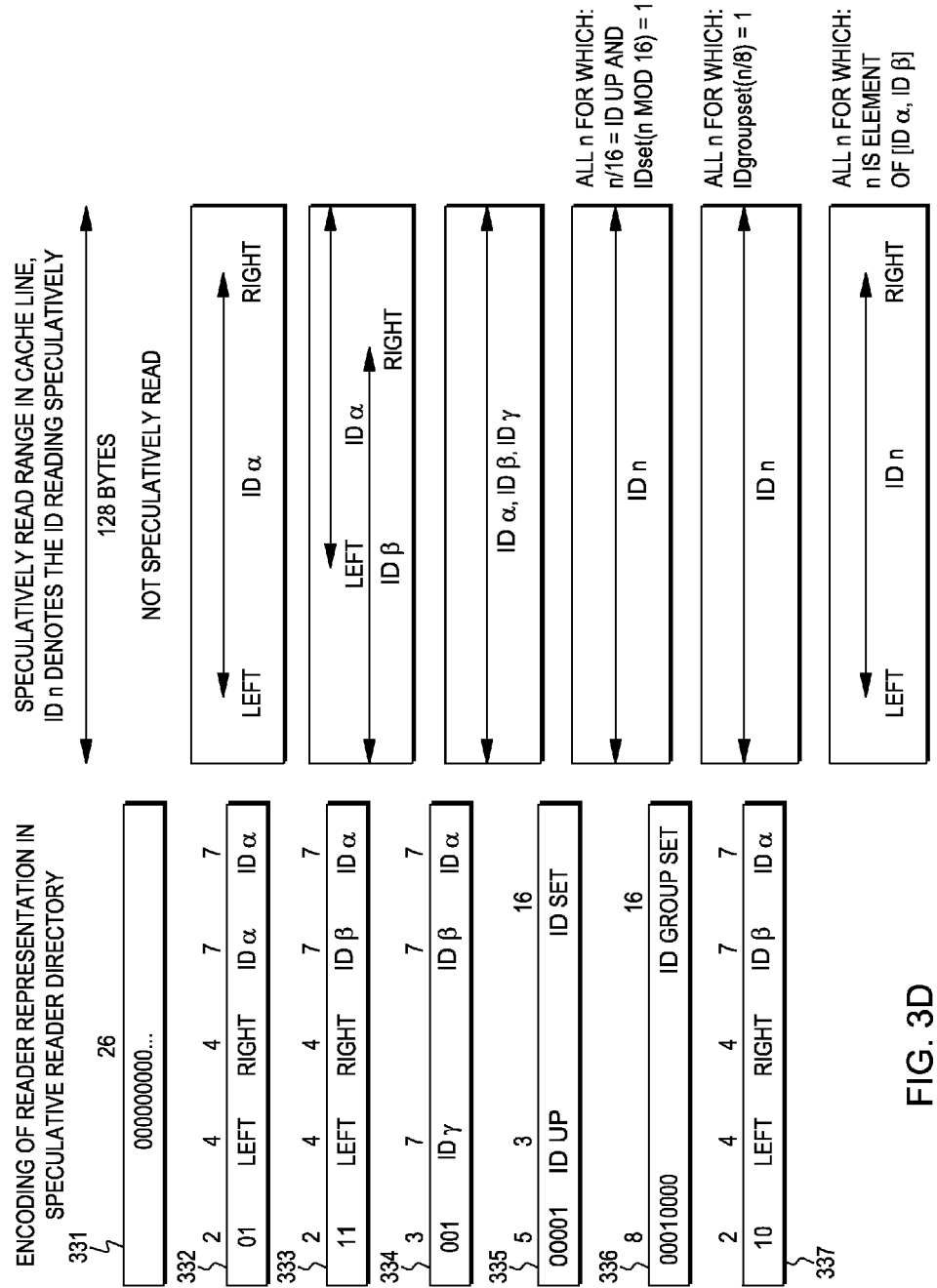
FIG. 3D shows more about encoding for the reader set aspect of the directory.

FIG. 3B shows more about the interaction between the directory pipe 308 and the directory SRAM 309. The vertical lines in the pipe represent time intervals during which data passes through a cascade of registers in the directory pipe. In a first time interval T1, a read is signaled to the directory SRAM. In a second time interval T2, data is read from the directory SRAM. In a third time interval, T3, a table lookup informs writes WR and WR DATA to the directory SRAM. In general, table lookup will govern the behavior of the directory SRAM to control cache accesses responsive to speculative execution. Only one table lookup is shown at T3, but more might be implemented. More about the contents of the directory SRAM is shown in FIGS. 3C and 3D, discussed further below. More about the action of the table lookup will be disclosed with respect to aspects of conflict checking and version aggregation.

Figure 4A:
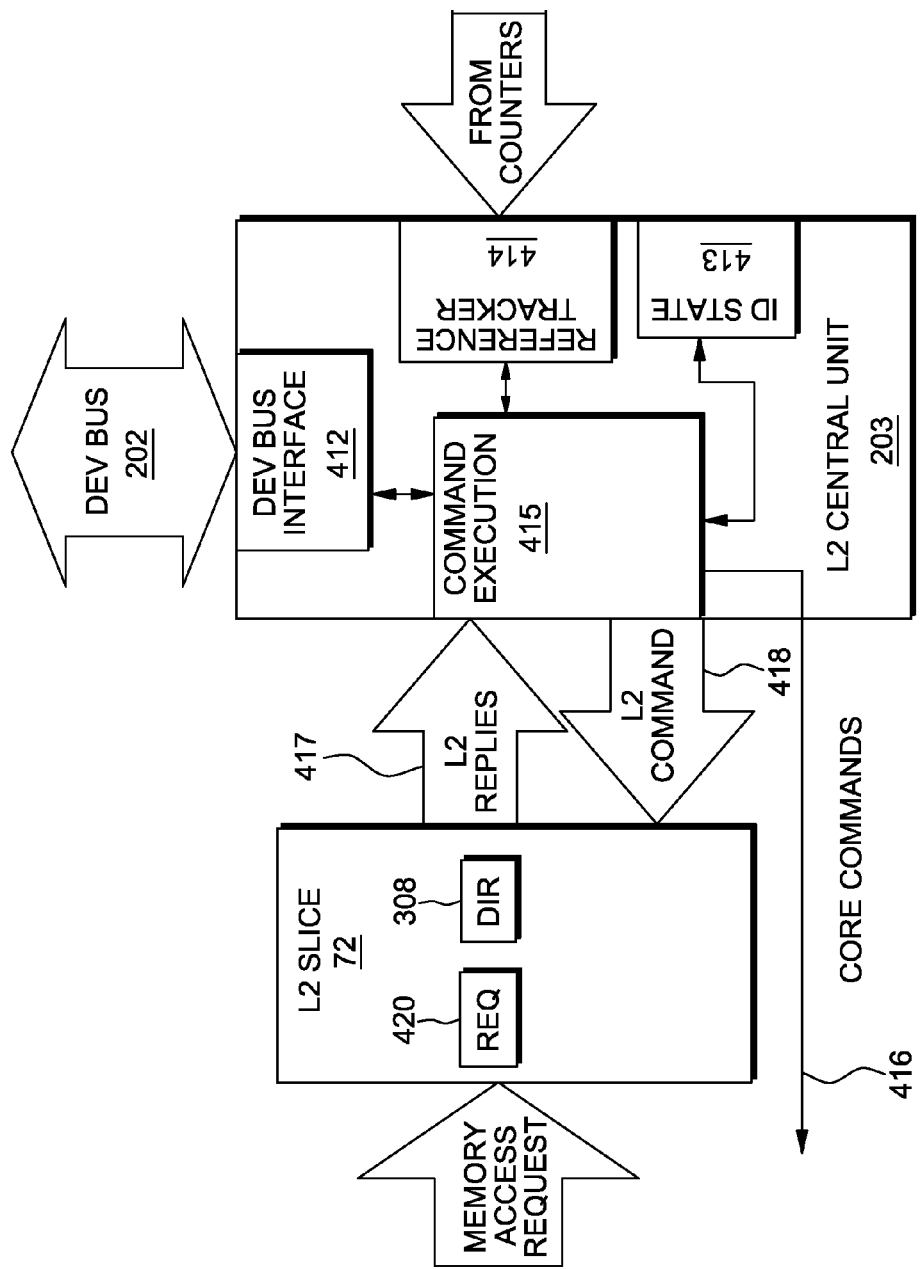
FIG. 4A shows more detail of operation of the L2 central unit.

The L2 central unit 203 is illustrated in FIG. 4A. It is accessed by the cores via its interface 412 to the device bus—DEV BUS 201. The DEV Bus interface is a queue of requests presented for execution. The state table that keeps track of the state of thread ID's is shown at 413. More about the contents of this block will be discussed below, with respect to FIG. 4B.

The L2 counter units 201 track the number of ID references—directory entries that store an ID—in a group of four slices. These counters periodically—in the current implementation every 4 cycles—send a summary of the counters to the L2 central unit. The summaries indicate which ID has zero references and which have one or more references. The "reference tracking unit" 414 in the L2 CENTRAL aggregates the summaries of all four counter sets and determines which IDs have zero references in all counter sets. IDs that have been committed or invalidated and that have zero references in the directory can be reused for a new speculation task.

A command execution unit 415 coordinates operations with respect to speculation ID's. Operations associated with FIGS. 4C, 5, 6, 8, 9, 10, 11, and 11a are conducted in unit 415. It decodes requests received from the DEV BUS. If the command is an ID allocation, the command execution unit goes to the ID state table 413 and looks up an ID that is available, changes the state to speculative and returns the value back via the DEV BUS. It sends commands at 416 to the core 52, such as when threads need to be invalidated and switching between evict on write and address aliasing. The command execution unit also sends out responses to commands to the L2 via the dedicated interfaces. An example of such a command might be to update the state of a thread.

The L2 slices 72 communicate to the central unit at 417, typically in the form of replies to commands, though sometimes the communications are not replies, and receive commands from the central unit at 418. Other examples of what might be transmitted via the bus labeled "L2 replies" include signals from the slices indicating if a conflict has happened. In this case, a signal can go out via a dedicated broadcast bus to the cores indicating the conflict to other devices, that an ID has changed state and that an interrupt should be generated.

The L2 slices receive memory access requests at 419 from the L1D at a request interface 420. The request interface forwards the request to the directory pipe 308 as shown in more detail in FIG. 3.

Support for such functionalities includes additional bookkeeping and storage functionality for multiple versions of the same physical memory line.

Figure 4B:
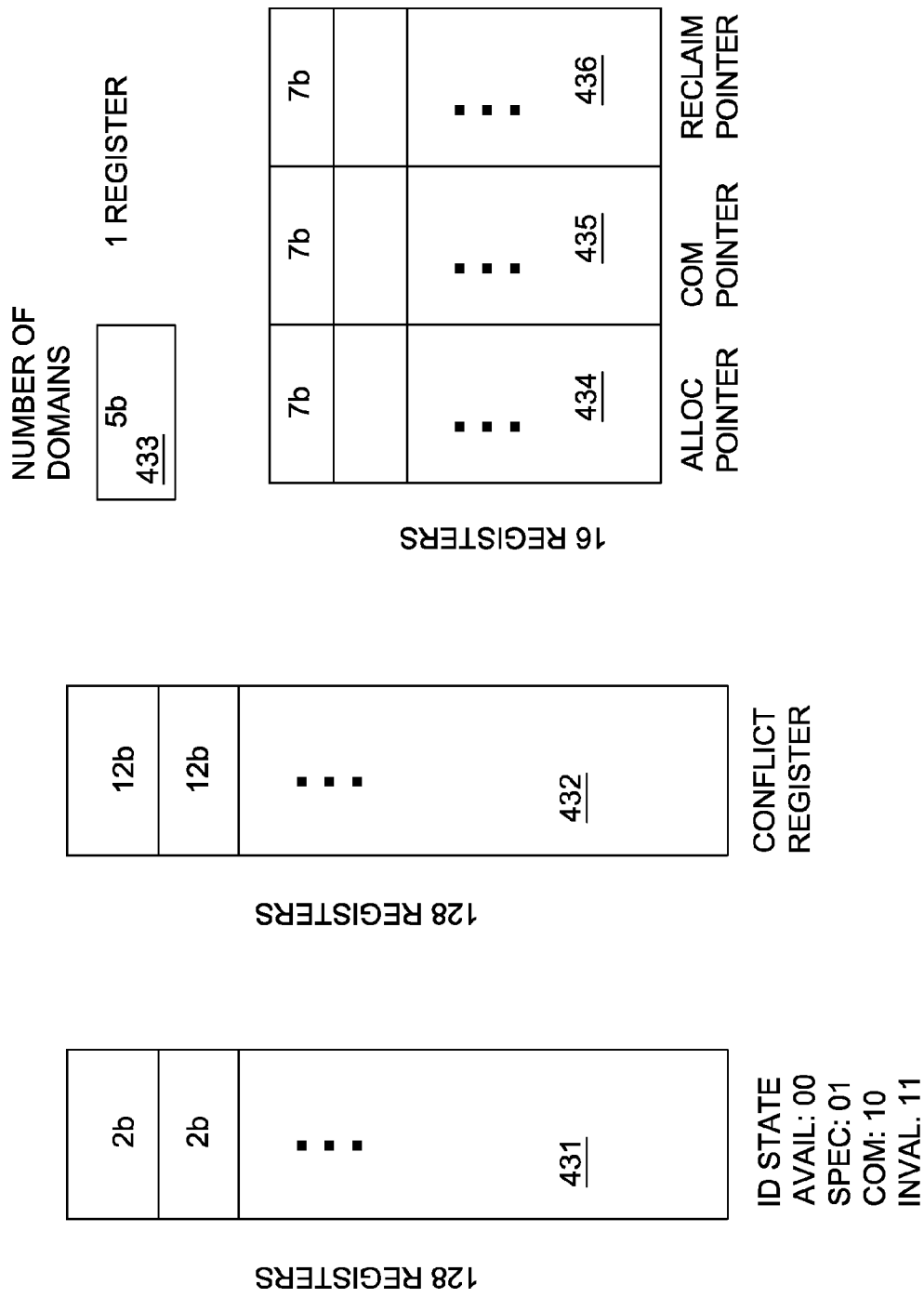
FIG. 4B shows registers in a state table.

FIG. 4B shows various registers of the ID STATE table 413. All of these registers can be read by the operating system.

These registers include 128 two bit registers 431, each for storing the state of a respective one of the 128 possible thread IDs. The possible states are:

| STATE | ENCODING |
|---|---|
| AVAILABLE | 00 |
| SPECULATIVE | 01 |
| COMMITTED | 10 |
| INVALID | 11 |

By querying the table on every use of an ID, the effect of instantaneous ID commit or invalidation can be achieved by changing the state associated with the ID to committed or invalid. This makes it possible to change a thread's state without having to find and update all the thread's lines in the L2 directory; also it saves directory bits.

Another set of 128 registers 432 is for encoding conflicts associated with IDs. More detail of these registers is shown at FIG. 4E. There is a register of this type for each speculation ID. This register contains the following fields:

Rflag 455, one bit indicating a resource based conflict. If this flag is set, it indicates either an eviction from L2 that would have been required for successful completion, or indicates a race condition during an L1 or L1P hit that may have caused stale data to be used;

Nflag 454, one bit indicating conflict with a non-speculative thread;

Mflag 453, one bit indicating multiple conflicts, i.e. conflict with two or more speculative threads. If M flag is clear and 1 flag is set, then the Conflict ID provides the ID of the only thread in conflict;

Aflag 452, one bit which is the allocation prevention flag. This is set during allocation. It is cleared explicitly by software to transfer ownership of the ID back to hardware. While set, it prevents hardware from reusing a speculation ID;

1 flag 451, one bit indicating conflict with one or more other speculative threads. If set, conflict ID indicates the first conflicting thread;

Conflict ID 450, seven bits indicating the ID of the first encountered conflict with other speculative threads.

Another register 433 has 5 bits and is for indicating how many domains have been created.

A set of 16 registers 434 indicates an allocation pointer for each domain. A second set of 16 registers 435 indicates a commit pointer for each domain. A third set of 16 registers 436 indicates a reclaim pointer for each domain. These three pointer registers are seven bits each.

Figure 4C:
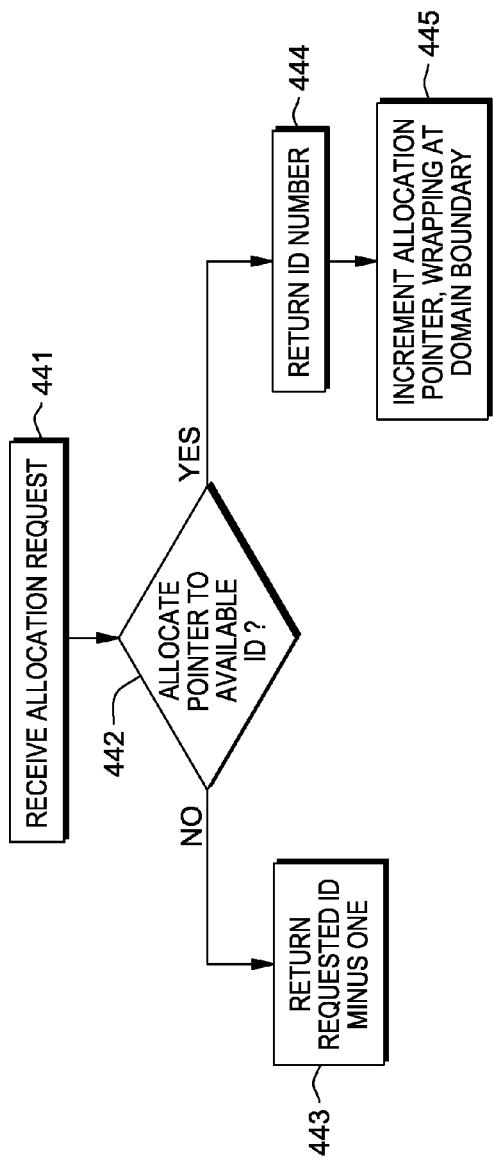
FIG. 4C shows allocation of ID's

FIG. 4C shows a flowchart for an ID allocation routine. At 441 a request for allocating an ID is received. At 442, a determination is made whether the ID is available. If the ID is not available, the routine returns the previous ID at 443. If the ID is available, the routine returns the ID at 444 and increments the allocation pointer at 445, wrapping at domain boundaries.

Figure 4D:
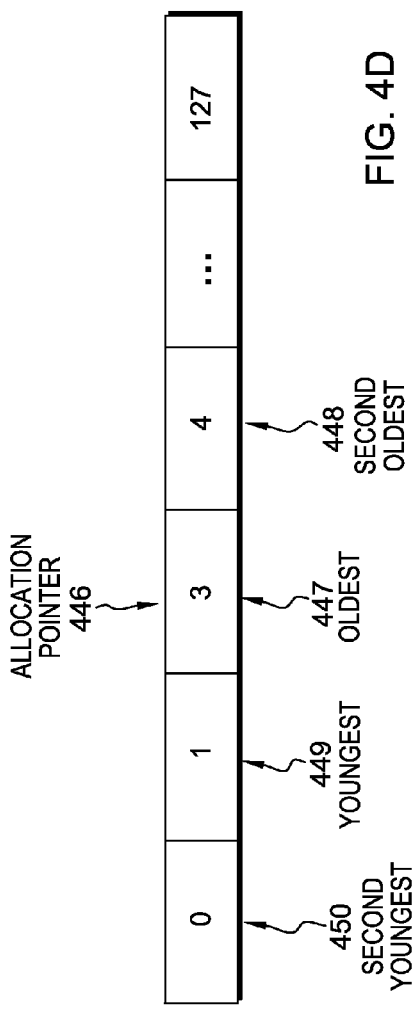
FIG. 4D shows an ID space and action of an allocation pointer.

FIG. 4D shows a conceptual diagram of allocation of IDs within a domain. In this particular example, only one domain of 127 IDs is shown. An allocation pointer is shown at 446 pointing at speculation ID 3. Order of the IDs is of special relevance for TLS. Accordingly, the allocation pointer points at the oldest speculation ID 447, with the next oldest being at 448. The point where the allocation pointer is pointing is also the wrap point for ordering, so the youngest and second youngest are shown at 449 and 450.

ID Ordering for Speculative Execution

The numeric value of the speculation ID is used in Speculative Execution to establish a younger/older relationship between speculative tasks. IDs are allocated in ascending order and a larger ID generally means that the ID designates accesses of a younger task.

To implement in-order allocation, the L2 CENTRAL at 413 maintains an allocation pointer 434. A function ptr_try_allocate tries to allocate the ID the pointer points to and, if successful, increments the pointer. More about this function can be found in a table of functions listed below.

As the set of IDs is limited, the allocation pointer 434 will wrap at some point from the largest ID to the smallest ID.

Following this, the ID ordering is no longer dependent on the ID values alone. To handle this case, in addition to serving for ID allocation, the allocation pointer also serves as pointer to the wrap point of the currently active ID space. The ID the allocation pointer points to will be the youngest ID for the next allocation. Until then, if it is still active, it is the oldest ID of the ID space. The (allocation pointer−1) ID is the ID most recently allocated and thus the youngest. So the ID order is defined as:

Alloc_pointer+0: oldest ID

Alloc_pointer+1: second oldest ID

. . .

Alloc_pointer−2: second youngest ID

Alloc_pointer−1: youngest ID

The allocation pointer is a 7 b wide register. It stores the value of the ID that is to be allocated next. If an allocation is requested and the ID it points to is available, the ID state is changed to speculative, the ID value is returned to the core and the pointer content is incremented.

The notation means: if the allocation pointer is, e.g., 10, then ID 0 is the oldest, 11 second oldest, . . . , 8 second youngest and 9 youngest ID.

Aside from allocating IDs in order for Speculative Execution, the IDs must also be committed in order. L2 CENTRAL provides a commit pointer 435 that provides an atomic increment function and can be used to track what ID to commit next, but the use of this pointer is not mandatory.

Figure 6:
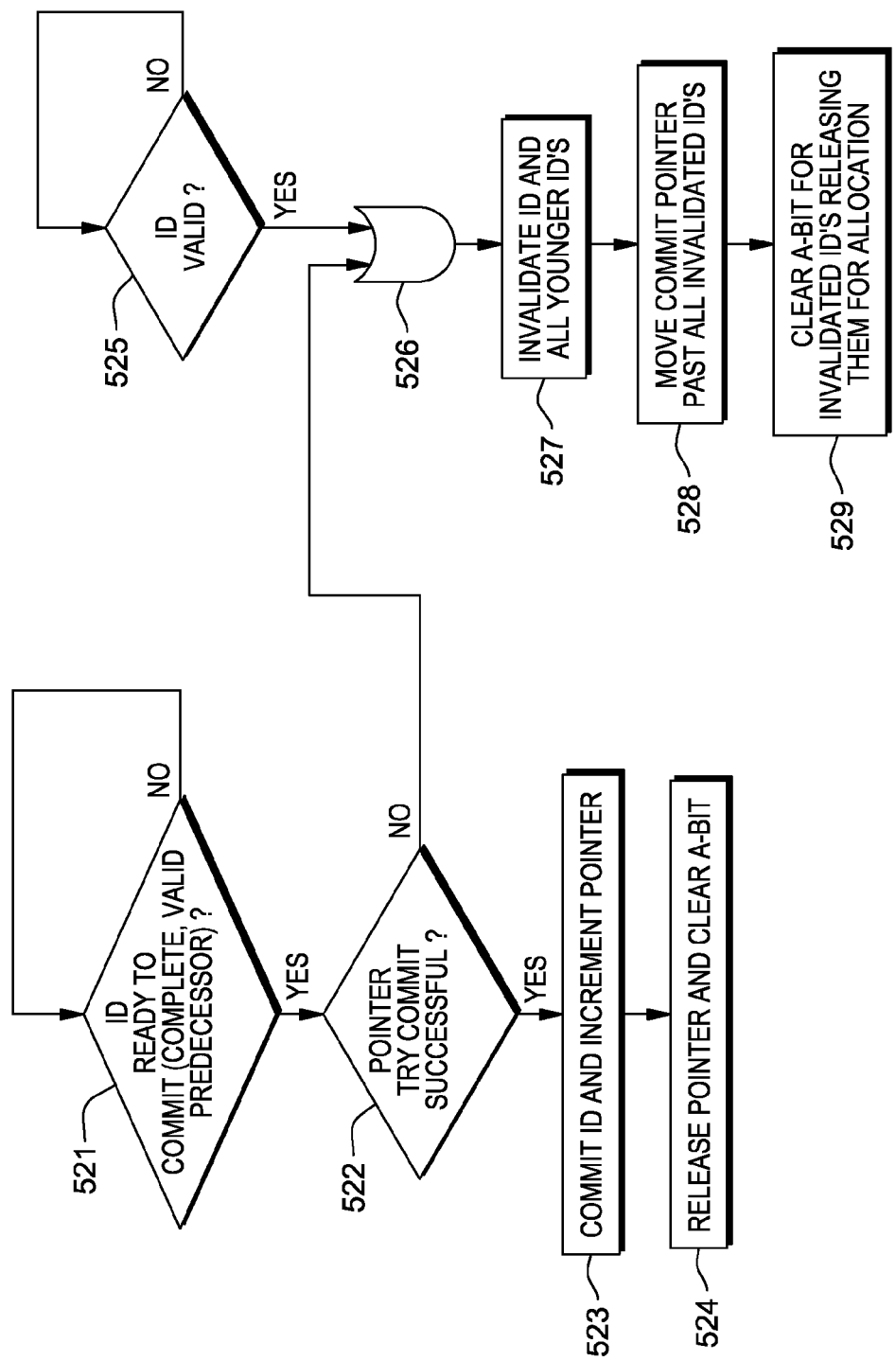
FIG. 6 shows some steps regarding committing and invalidating IDs.

Per FIG. 6, when an ID is ready to commit at 521, i.e., its predecessor has completed execution and did not get invalidated, a ptr_try_commit can be executed 522. In case of success, the ID the pointer points to gets committed and the pointer gets incremented at 523. At that point, the ID can be released by clearing the A-bit at 524.

If the commit fails or (526) the ID was already invalid before the commit attempt at 525, the ID the commit pointer points to needs to be invalidated along with all younger IDs currently in use at 527. Then the commit pointer must be moved past all invalidated IDs by directly writing to the commit pointer register 528. Then, the A-bit for all invalidated IDs the commit pointer moved past can be cleared and thus released for reallocation at 529. The failed speculative task then needs to be restarted.

Speculation ID Reclaim

To support ID cleanup, the L2 cache maintains a Use Counter within units 201 for each thread ID. Every time a line is established in L2, the use counter corresponding to the ID of the thread establishing the line is incremented. The use counter also counts the occurrences of IDs in the speculative reader set. Therefore, each use counter indicates the number of occurrences of its associated ID in the L2.

At intervals programmable via DCR the L2 examines one directory set for lines whose thread IDs are invalid or committed. For each such line, the L2 removes the thread ID in the directory, marks the cache line invalid or merges it with the non-speculative state respectively, and decrements the use counter associated with that thread ID. Once the use counter reaches zero, the ID can be reclaimed, provided that its A bit has been cleared. The state of the ID will switch to available at that point. This is a type of lazy cleanup. More about lazy evaluation can be found the in Wikipedia article entitled "Lazy Evaluation."

Domains

Parallel programs are likely to have known independent sections that can run concurrently. Each of these parallel sections might, during the annotation run, be decomposed into speculative threads. It is convenient and efficient to organize these sections into independent families of threads, with one committed thread for each section. The L2 allows for this by using up to the four most significant bits of the thread ID to indicate a speculation domain. The user can partition the thread space into one, two, four, eight or sixteen domains. All domains operate independently with respect to allocating, checking, promoting, and killing threads. Threads in different domains can communicate if both are non-speculative; no speculative threads can communicate outside their domain, for reasons detailed below.

Per FIG. 4B, each domain requires its own allocation 434 and commit pointers 435, which wrap within the subset of thread IDs allocated to that domain.

Transactional Memory

Figure 7:
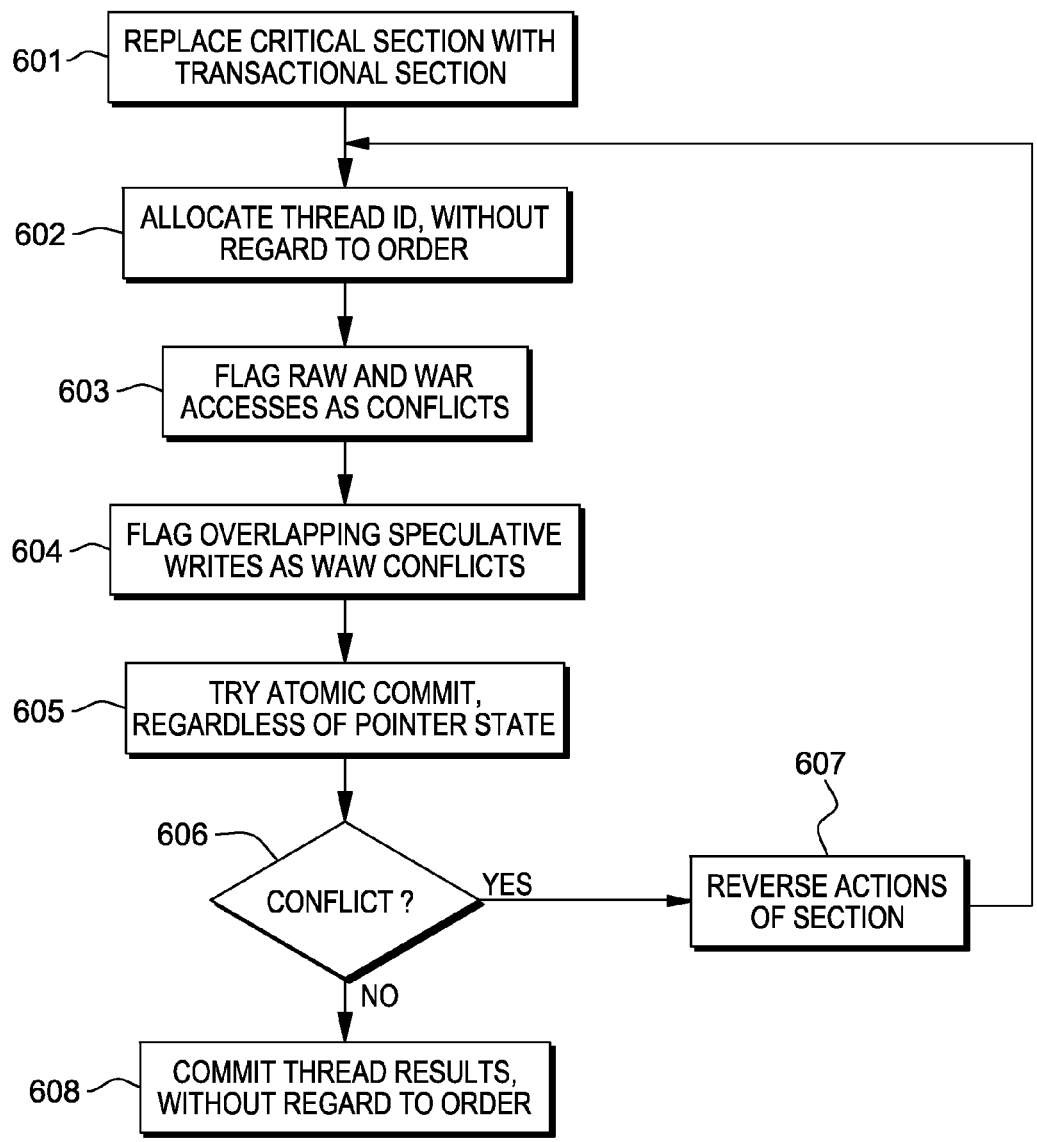
FIG. 7 is a flowchart of operations relating to a transactional memory model.

The L2's speculation mechanisms also support a transactional-memory (TM) programming model, per FIG. 7. In a transactional model, the programmer replaces critical sections with transactional sections at 601, which can manipulate shared data without locking.

The implementation of TM uses the hardware resources for speculation. A difference between TLS and TM is that TM IDs are not ordered. As a consequence, IDs can be allocated at 602 and committed in any order 608. The L2 CENTRAL provides a function that allows allocation of any available ID from a pool (try_alloc_avail) and a function that allows an ID to be atomically committed regardless of any pointer state (try_commit) 605. More about these functions appears in a table presented below.

The lack of ordering means also that the mechanism to forward data from older threads to younger threads cannot be used and both RAW as well as WAR accesses must be flagged as conflicts at 603. Two IDs that have speculatively written to the same location cannot both commit, as the order of merging the IDs is not tracked. Consequently, overlapping speculative writes are flagged as WAW conflicts 604.

A transaction succeeds 608 if, while the section executes, no other thread accesses to any of the addresses it has accessed, except if both threads are only reading per 606. If the transaction does not succeed, hardware reverses its actions 607: its writes are invalidated without reaching external main memory. The program generally loops on a return code and reruns failing transactions.

Mode Switching

Each of the three uses of the speculation facilities

1. TLS
2. TM
3. Rollback Mode require slightly different behavior from the underlying hardware. This is achieved by assigning to each domain of speculation IDs one of the three modes. The assignment of modes to domains can be changed at run time. For example, a program may choose TLS at some point of execution, while at a different point transactions supported by TM are executed. During the remaining execution, rollback mode should be used.

Figure 8:
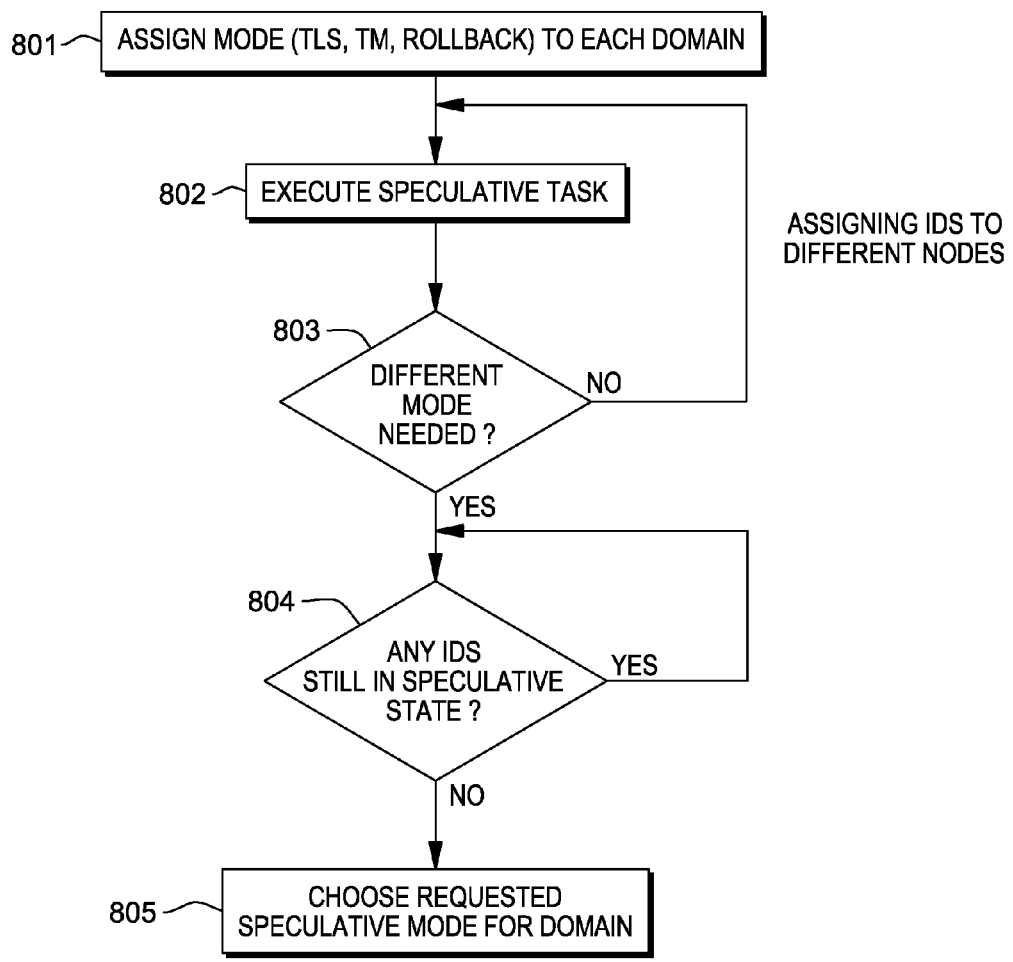
FIG. 8 is a flowchart showing assigning domains to different speculative modes.
Figure 9:
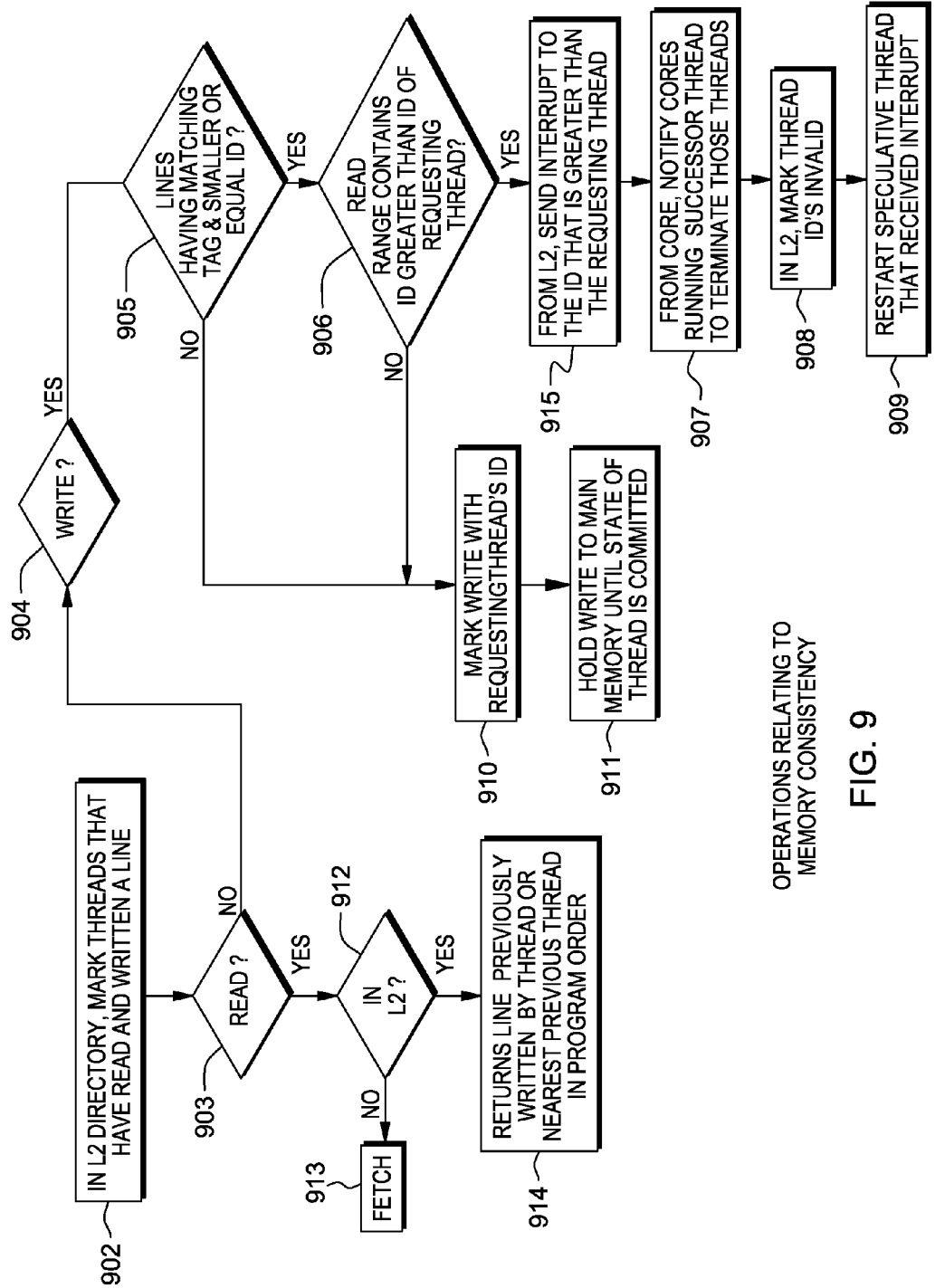
FIG. 9 is a flowchart showing operations relating to memory consistency.

FIG. 8 shows starting with one of the three modes at 801. Then a speculative task is executed at 802. If a different mode is needed at 803, it cannot be changed if any of the IDs of the domain is still in the speculative state per 804. If the current mode is TLS, the mode can in addition not be changed while any ID is still in the committed state, as lines may contain multiple committed versions that rely on the TLS mode to merge their versions in the correct order. Once the IDs are committed, the domain can be chosen at 805.

Memory Consistency

This section describes the basic mechanisms used to enforce memory consistency, both in terms of program order due to speculation and memory visibility due to shared memory multiprocessing, as it relates to speculation.

The L2 maintains the illusion that speculative threads run in sequential program order, even if they do not. Per FIG. 9, to do this, the L2 may need to store unique copies of the same memory line with distinct thread IDs. This is necessary to prevent a speculative thread from writing memory out of program order.

At the L2 at 902, the directory is marked to reflect which threads have read and written a line when necessary. Not every thread ID needs to be recorded, as explained with respect to the reader set directory, see e.g. FIG. 3D.

On a read at 903, the L2 returns the line that was previously written by the thread that issued the read or else by the nearest previous thread in program order 914; if the address is not in L2 912, the line is fetched 913 from external main memory.

On a write 904, the L2 directory is checked for illusion-breaking reads—reads by threads later in program order. More about this type of conflict checking is explained with reference to FIGS. 3C through 3I-2. That is, it checks all lines in the matching set that have a matching tag and an ID smaller or equal 905 to see if their read range contains IDs that are greater than the ID of the requesting thread 906. If any such line exists, then the oldest of those threads and all threads younger than it are killed 915, 907, 908, 909. If no such lines exist, the write is marked with the requesting thread's ID 910. The line cannot be written to external main memory if the thread ID is speculative 911.

To kill a thread (and all younger threads), the L2 sends an interrupt 915 to the corresponding core. The core receiving the interrupt has to notify the cores running its successor threads to terminate these threads, too per 907. It then has to mark the corresponding thread IDs invalid 908 and restart its current speculative thread 909.

Commit Race Window Handling

Figure 10:
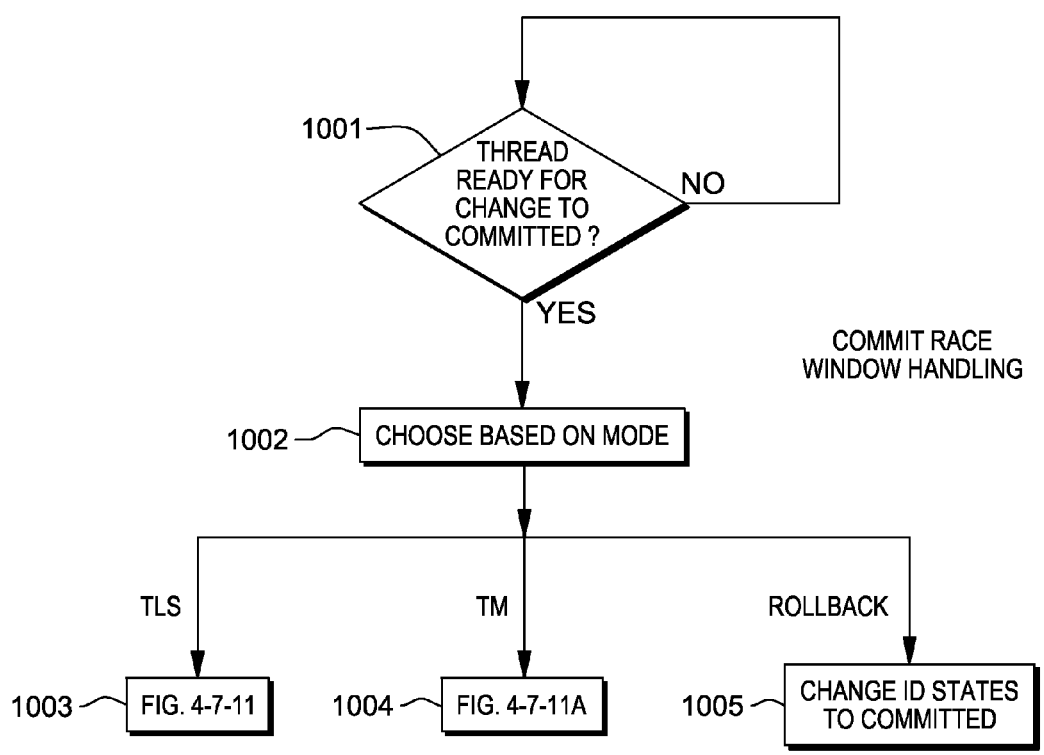
FIG. 10 is flowchart showing operations relating to commit race window handling.

Per FIG. 10, when a speculative TLS or TM ID's status is changed to committed state per 1001, the system has to ensure that a condition that leads to an invalidation has not occurred before the change to committed state has reached every L2 slice. As there is a latency from the point of detection of a condition that warrants an invalidation until this information reaches the commit logic, as well as there is a latency from the point of initiating the commit until it takes effect in all L2 slices, it is possible to have a race condition between commit and invalidation.

To close this window, the commit process is managed in TLS, TM mode, and rollback mode 1003, 1004, 1005. Rollback mode requires equivalent treatment to transition IDs to the invalid state.

Transition to Committed State

To avoid the race, the L2 gives special handling to the period between the end of a committed thread and the promotion of the next. Per 1003 and FIG. 11, for TLS, after a committed thread completes at 1101, the L2 keeps it in committed state 1102 and moves the oldest speculative thread to transitional state 1103. L2_central has a register that points to the ID currently in transitional state (currently committing). The state register of the ID points during this time to the speculative state. Newly arriving writes 1104 that can affect the fate of the transitional thread—writes from outside the domain and writes by threads older than the transitional thread 1105—are blocked when detected 1106 inside the L2.

After all side effects, e.g. conflicts, from writes initiated before entering the transitional state have completed 1107—if none of them cause the transitional thread to be killed 1008—the transitional thread is promoted 1009 and the blocked writes are allowed to resume 1010. If side effects cause the transitional thread to fail, at 1111, the thread is invalidated, a signal sent to the core, and the writes are also unblocked at 1110.

Figure 11:
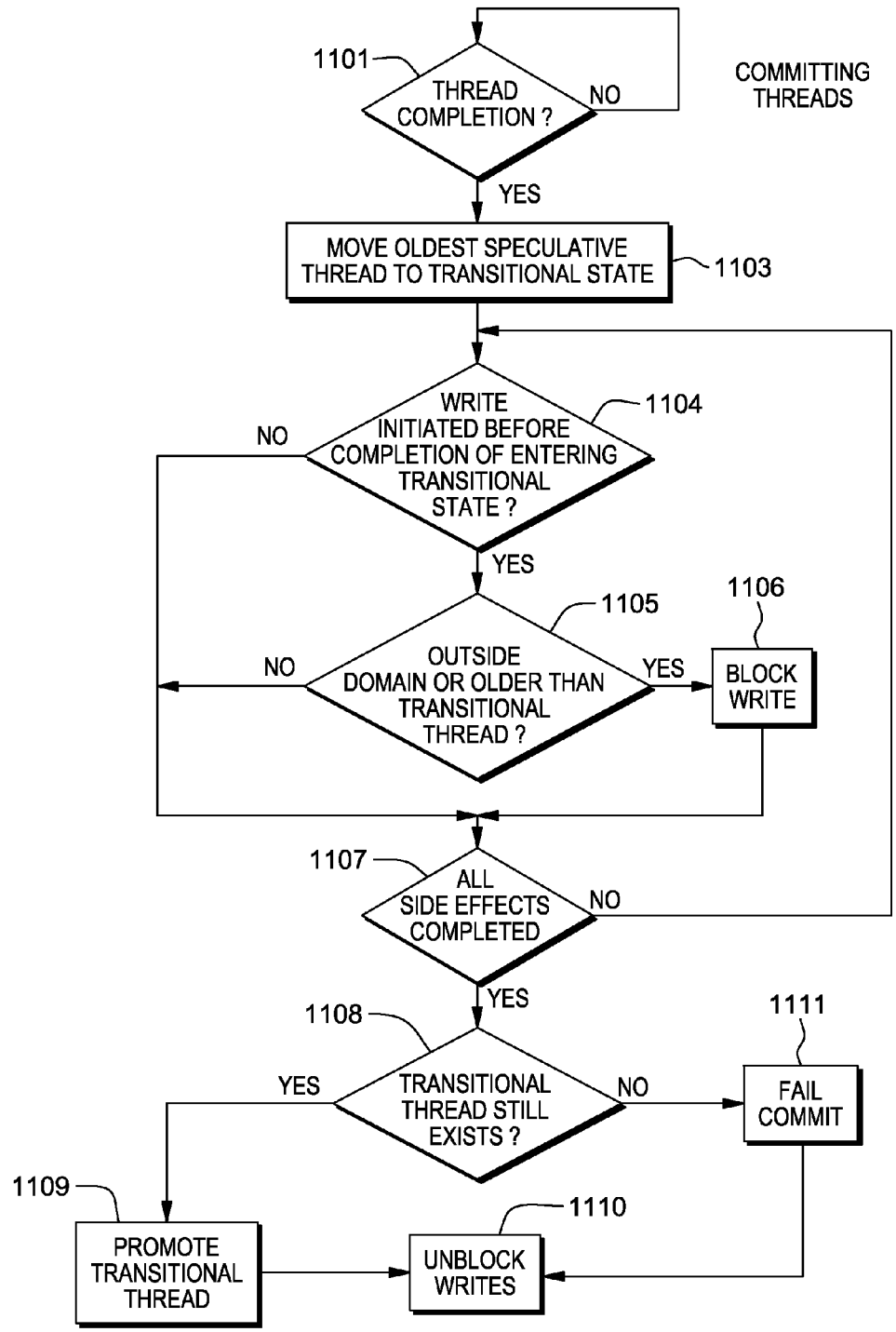
FIG. 11 is a flowchart showing operations relating to committed state for TM
Figure 11A:
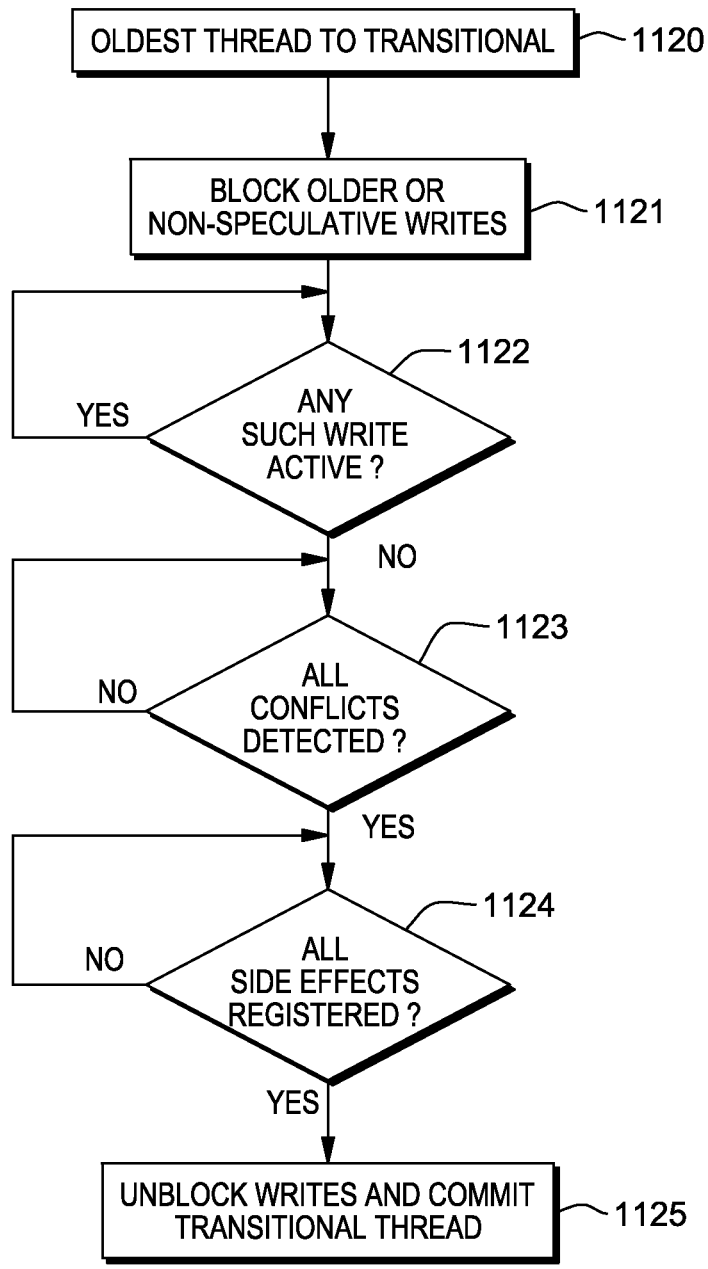
FIG. 11A is a flow chart showing operations relating to committed state for TLS

In the case of TM, first the thread to be committed is set to a transitional state at 1120 of FIG. 11a. Then accesses from other speculative threads or non-speculative writes are blocked at 1121. If any such speculative access or non-speculative write are active, then the system has to wait at 1122. Otherwise conflicts must be checked for at 1123. If none are present, then all side effects must be registered at 1124, before the thread may be committed and writes resumed at 1125.

Thread ID Counters

A direct implementation of the thread ID use counters would require each of the 16 L2's to maintain 128 counters (one per thread ID), each 16 bits (to handle the worst case where all 16 ways in all 1024 sets have a read and a write by that thread). These counters would then be ORd to detect when a count reached zero.

Instead, groups of L2's manipulate a common group-wide-shared set of counters 201. The architecture assigns one counter set to each set of 4 L2-slices. The counter size is increased by 2 bits to handle directories for 4 caches, but the number of counters is reduced 4-fold. The counters become more complex because they now need to simultaneously handle combinations of multiple decrements and increments.

As a second optimization, the number of counters is reduced a further 50% by sharing counters among two thread IDs. A nonzero count means that at least one of the two IDs is still in use. When the count is zero, both IDs can potentially be reclaimed; until then, none can be reclaimed. The counter size remains the same, since the 4 L2's still can have at most 4*16*1024*3 references total.

A drawback of sharing counters is that IDs take longer to be reused—none of the two IDs can be reused until both have a zero count. To mitigate this, the number of available IDs is made large (128) so free IDs will be available even if several generations of threads have not yet fully cleared.

After a thread count has reached zero, the thread table is notified that those threads are now available for reuse.

Conflict Handling

Conflict Recording

To detect conflicts, the L2 must record all speculative reads and writes to any memory location.

Speculative writes are recorded by allocating in the directory a new way of the selected set and marking it with the writer ID. The set contains 16 dirty bits that distinguish which double word of the 128 B line has been written by the speculation ID. If a sub-double word write is requested, the L2 treats this as a speculative read of a double word, insertion of the write data into that word followed by full a double word write.

FIG. 3C shows the formats of 4 directory SRAMs included at 309, to wit:

a base directory 321;

a least recently used directory 322;

a COH/dirty directory 323 and 323'; and a speculative reader directory 324, which will be described in more detail with respect to FIG. 3D.

In the base directory, 321, there are 15 bits that represent the upper 15 b address bits of the line stored at 271. Then there is a seven bit speculative writer ID field 272 that indicates which speculation ID wrote to this line and a flag 273 that indicates whether the line was speculatively written. Then there is a two bit speculative read flag field 274 indicating whether to invoke the speculative reader directory 324, and a one bit "current" flag 275. The current flag 275 indicates whether the current line is assembled from more than one way or not. The core 52 does not know about the fields 272-275. These fields are set by the L2 directory pipeline.

If the speculative writer flag is checked, then the way has been written speculatively, not taken from main memory and the writer ID field will say what the writer ID was. If the flag is clear, the writer ID field is irrelevant.

The LRU directory indicates "age", a relative ordering number with respect to last access. This directory is for allocating ways in accordance with the Least Recently Used algorithm.

The COH/dirty directory has two uses, and accordingly two possible formats. In the first format, 323, known as "COH," there are 17 bits, one for each core of the system. This format indicates, when the writer flag is not set, whether the corresponding core has a copy of this line of the cache. In the second format, 323', there are 16 bits. These bits indicate, if the writer flag is set in the base directory, which part of the line has been modified speculatively. The line has 128 bytes, but they are recorded at 323' in groups of 8 bytes, so only 16 bits are used, one for each group of eight bytes.

Speculative reads are recorded for each way from which data is retrieved while processing a request. As multiple speculative reads from different IDs for different sections of the line need to be recorded, the L2 uses a dynamic encoding that provides a superset representation of the read accesses.

In FIG. 3C, the speculative reader directory 324 has fields PF for parameters 281, left boundary 282, right boundary 283, a first speculative ID 284, and a second ID 285. The speculative reader directory is invoked in response to flags in field 274.

FIG. 3D relates to an embodiment of use of the reader set directory. The left column of FIG. 3D illustrates seven possible formats of the reader set directory, while the right column indicates what the result in the cache line would be for that format. Formats 331, 336, and 337 can be used for TLS, while formats 331-336 can be used for TM.

Format 331 indicates that no speculative reading has occurred.

If only a single TLS or TM ID has read the line, the L2 records the ID along with the left and right boundary of the line section so far accessed by the thread. Boundaries are always rounded to the next double word boundary. Format 332 uses two bit code "01" to indicate that a single seven bit ID, α, has read in a range delimited by four bit parameters denoted "left" and "right".

If two IDs in TM have accessed the line, the IDs along with the gap between the two accessed regions are recorded. Format 333 uses two bit code "11" to indicate that a first seven bit ID denoted "α" has read from a boundary denoted with four bits symbolized by the word "left" to the end of the line; while a seven bit second ID, denoted "β" has read from the beginning of the line to a boundary denoted by four bits symbolized by the word "right."

Format 334 uses three bit code "001" to indicate that three seven bit IDs, denoted "α," "β," and "γ," have read the entire line. In fact, when the entire line is indicated in this figure, it might be that less than the entire line has been read, but the encoding of this embodiment does not keep track at the sub-line granularity for more than two speculative IDs. One of ordinary skill in the art might devise other encodings as a matter of design choice.

Format 335 uses five bit code "00001" to indicate that several IDs have read the entire line. The range of IDs is indicated by the three bit field denoted "ID up". This range includes the sixteen IDs that share the same upper three bits. Which of the sixteen IDs have read the line is indicated by respective flags in the sixteen bit field denoted "ID set."

If two or more TLS IDs have accessed the line, the youngest and the oldest ID along with the left and right boundary of the aggregation of all accesses are recorded.

Format 336 uses the eight bit code "00010000" to indicate that a group of IDs has read the entire line. This group is defined by a 16 bit field denoted "IDgroupset."

Format 337 uses the two bit code "10" to indicate that two seven bit IDs, denoted "α" and "β" have read a range delimited by boundaries indicated by the four bit fields denoted "left" and "right."

When doing WAR conflict checking, per FIG. 3I-1 and FIG. 3I-2 below, the formats of FIG. 3D are used.

Rollback ID reads are not recorded.

If more than two TM IDs, a mix of TM and TLS IDs or TLS IDs from different domains have been recorded, only the 64 byte access resolution for the aggregate of all accesses is recorded.

FIG. 3E shows assembly of a cache line, as called for in element 512 of FIG. 5. In one way, there is unspecified data NSPEC at 3210. In another way, ID1 has written version 1 of the data at 3230, leaving undefined data at 3220 and 3240. In another way, ID2 has written version 2 of data 3260 leaving undefined areas 3250 and 3260. Ultimately, these three ways can be combined into an assembled way, having some NSPEC fields 3270, 3285, and 3300, version 1 at 3280 and Version 2 at 3290. This assembled way will be signaled in the directory, because it will have the current flag, 275, set. This is version aggregation is required whenever a data item needs to read from a speculative version, e.g., speculative loads or atomic RMW operations.

Figure 12:
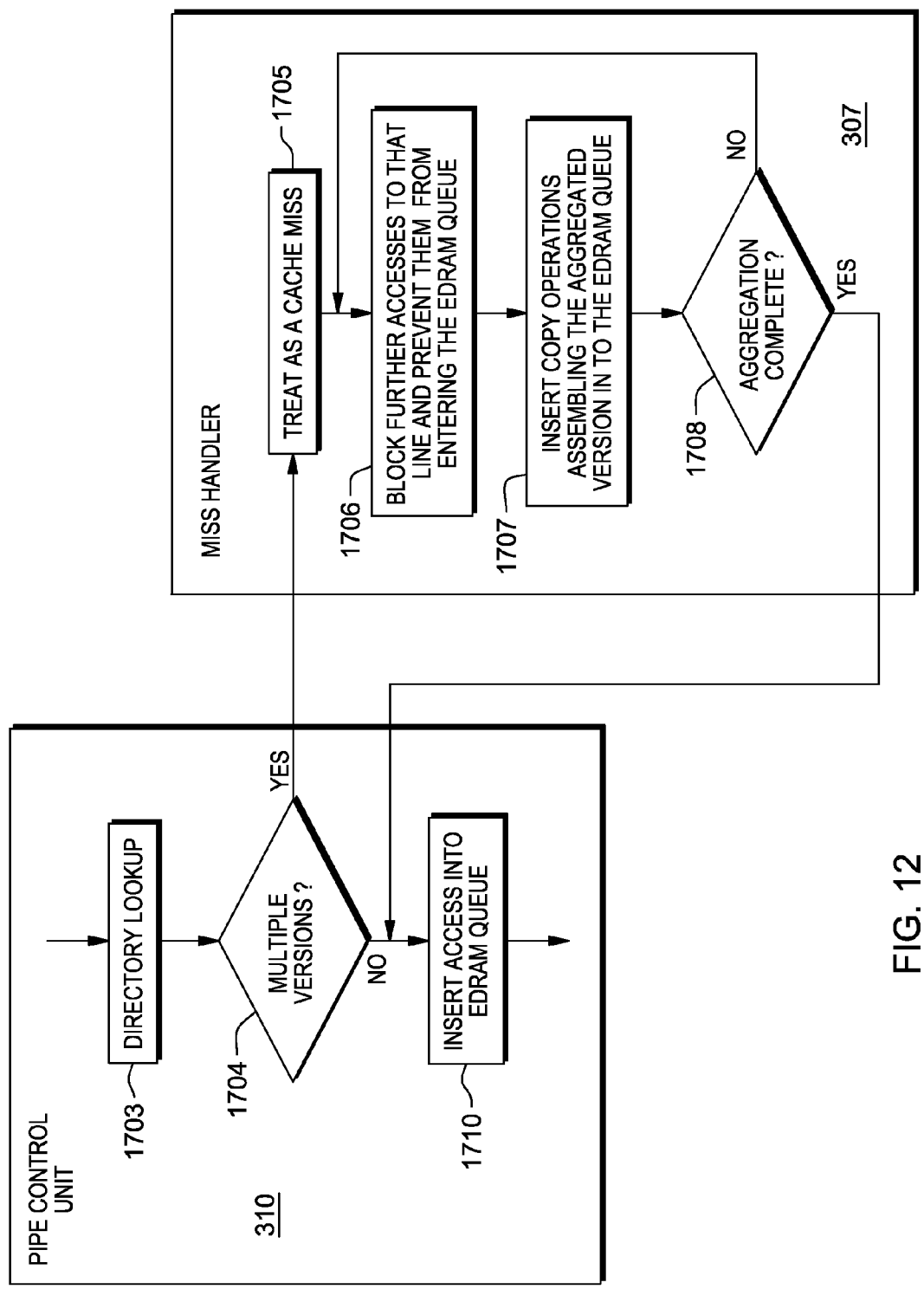
FIG. 12 shows an aspect of version aggregation

FIG. 12 shows a flow of version aggregation, per 512. At 1703, the procedure starts in the pipe control unit 310 with a directory lookup at 1703. If there are multiple versions of the line, further explained with reference to FIGS. 3E and 3G, this will be treated as a cache miss and referred to the miss handler 307. The miss handler will treat the multiple versions as a cache miss per 1705 and block further accesses to the EDRAM pipe at 1706. Insert copy operations will then be begun at 1707 to aggregate the versions into the EDRAM queue. When aggregation is complete at 1708, the final version is inserted into the EDRAM queue at 1710, otherwise 1706-1708 repeat.

In summary, then, the current bit 275 of FIG. 3C indicates whether data for this way contains only the speculatively written fields as written by the speculative writer indicated in the spec id writer field (current flag=0) or if the other parts of the line have been filled in with data from the non-speculative version or—if applicable—older TLS versions for the address (current flag=1). If the line is read using the ID that matches the spec writer ID field and the flag is set, no extra work is necessary and the data can be returned to the requestor (line has been made current recently). If the flag is clear in that case, the missing parts for the line need to be filled in from the other aforementioned versions. Once the line has been completed, the current flag is set and the line data is returned to the requestor.

Conflict Detection

For each request the L2 generates a read and write access memory footprint that describes what section of the 128 B line is read and/or written. The footprints are dependent on the type of request, the size info of the request as well as on the atomic operation code.

For example, an atomic load-increment-bounded from address A has a read footprint of the double word at A as well as the double word at A+8, and it has a write footprint of the double word at address A. The footprint is used matching the request against recorded speculative reads and writes of the line.

Conflict detection is handled differently for the three modes.

Figure 3F:
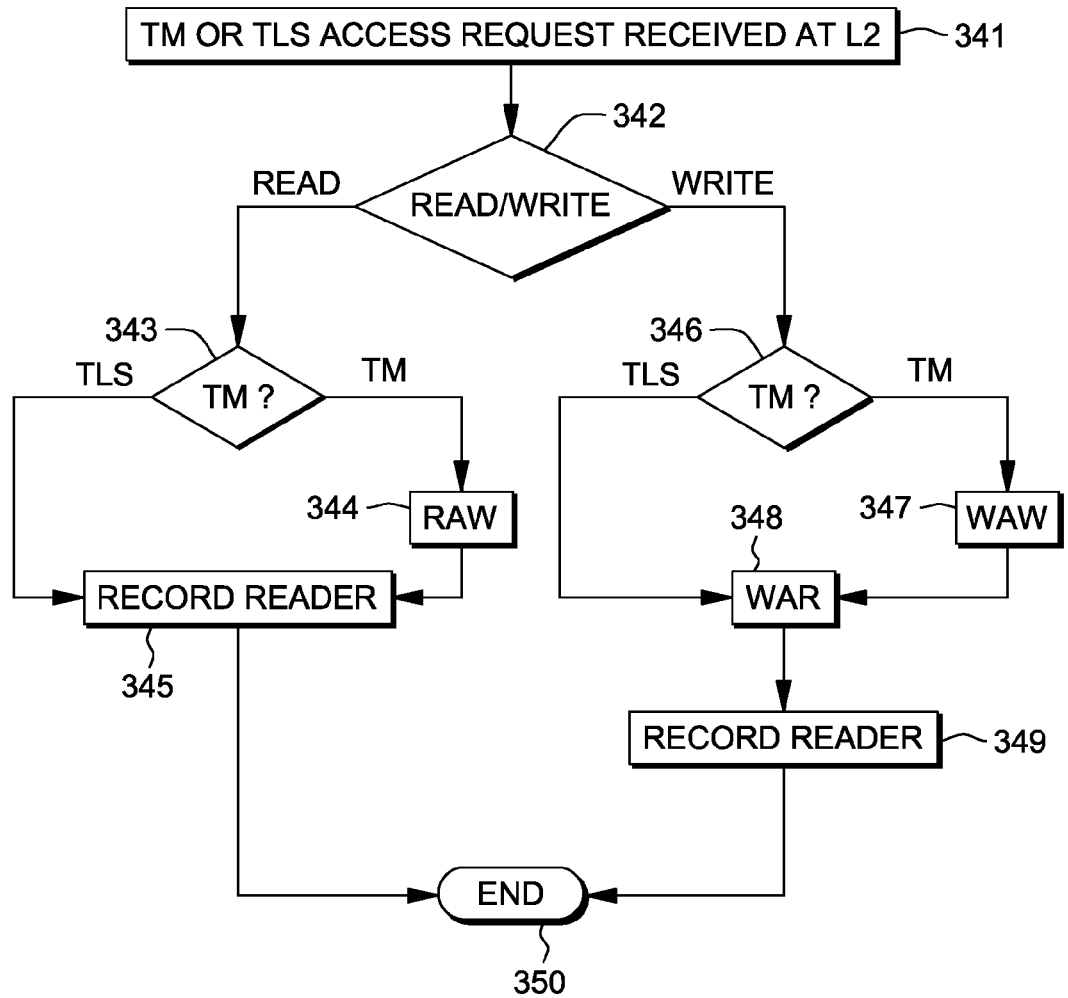
FIG. 3F shows an overview of conflict checking for TM and TLS.

Per FIG. 3F, due to the out-of-order commit and missing order of the IDs in TM, all RAW, WAR and WAW conflicts with other IDs are flagged as conflicts. With respect to FIG. 3H, for WAW and RAW conflicts, the read and write footprints are matched against the 16 b dirty set of all speculative versions and conflicts with the recorded writer IDs are signaled for each overlap.

With respect to FIG. 3I-2, for WAR conflicts, the left and the right boundary of the write footprint are matched against the recorded reader boundaries and a conflict is reported for each reader ID with an overlap.

Per FIG. 3F, in TLS mode, the ordering of the ID and the forwarding of data from older to younger threads requires only WAR conflicts to be flagged. WAR conflicts are processed as outlined for TM.

In Rollback mode, any access to a line that has a rollback version signals a conflict and commits the rollback ID unless the access was executed with the ID of the existing rollback version.

With respect to FIG. 3i-2, if TLS accesses encounter recorded IDs outside their domain and if TM accesses encounter recorded IDs that are non-TM IDs, all RAW, WAR and WAW cases are checked and conflicts are reported.

FIG. 3F shows an overview of conflict checking, which occurs 308 of FIG. 3. At 341 of FIG. 3F a memory access request is received that is either TLS or TM. At 342, it is determined whether the access is a read or a write or both. It should be noted that both types can exist in the same instruction. In the case of a read, it is then tested whether the access is TM at 343. If it is TLS, no further checks are required before recording the read at 345. If it is TM, a Read After Write ("RAW") check must be performed at 344 before recording the read at 345. In the case of a write, it is also tested whether the access is TLS or TM at 346. If it is a TLS access, then control passes to the Write After Read ("WAR") check 348. WAW is not necessarily a conflict for TLS, because the ID ordering can resolve conflicting writes. If it is a TM access then control passes to the Write After Write ("WAW") check 347 before passing to the WAR check 348. Thereafter the write can be recorded at 349.

Figure 3G:
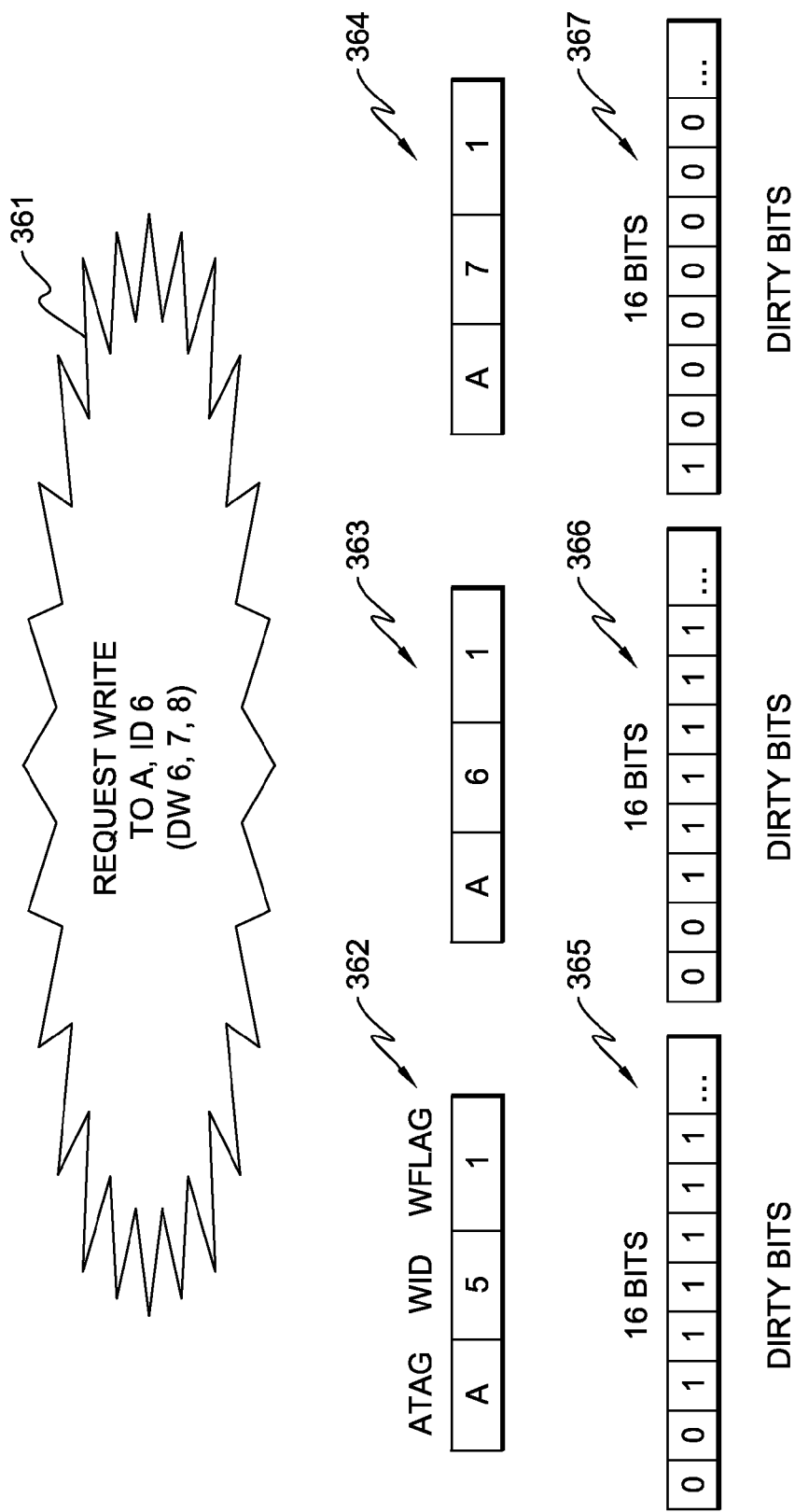
FIG. 3G illustrates an example of some aspects of conflict checking.

FIG. 3G shows an aspect of conflict checking. First, a write request comes in at 361. This is a request from the thread with ID 6 for a double word write across the 8 byte groups 6, 7, and 8 of address A. In the base directory 321, three ways are found that have speculative data written in them for address A. These ways are shown at 362, 363, 364. Way 362 was written for address A, by the thread with speculative ID number 5. The corresponding portion of the "dirty directory" 323 is shown at 365 indicates that this ID wrote at double words 6, 7 and 8. This means there is a potential conflict between ID's 5 and 6. Way 363 was written for address A by the thread with speculative ID number 6. This is not a conflict, because the speculative ID number matches that of the current write request. As a result the corresponding bits from the "dirty directory" at 366 are irrelevant. Way 364 was written for address A by the thread with speculative ID number 7; however the corresponding bits from the "dirty directory" at 367 indicate that only double word 0 was written. As a result, there is no conflict between speculative IDs numbered 6 and 7 for this write.

Figure 3H:
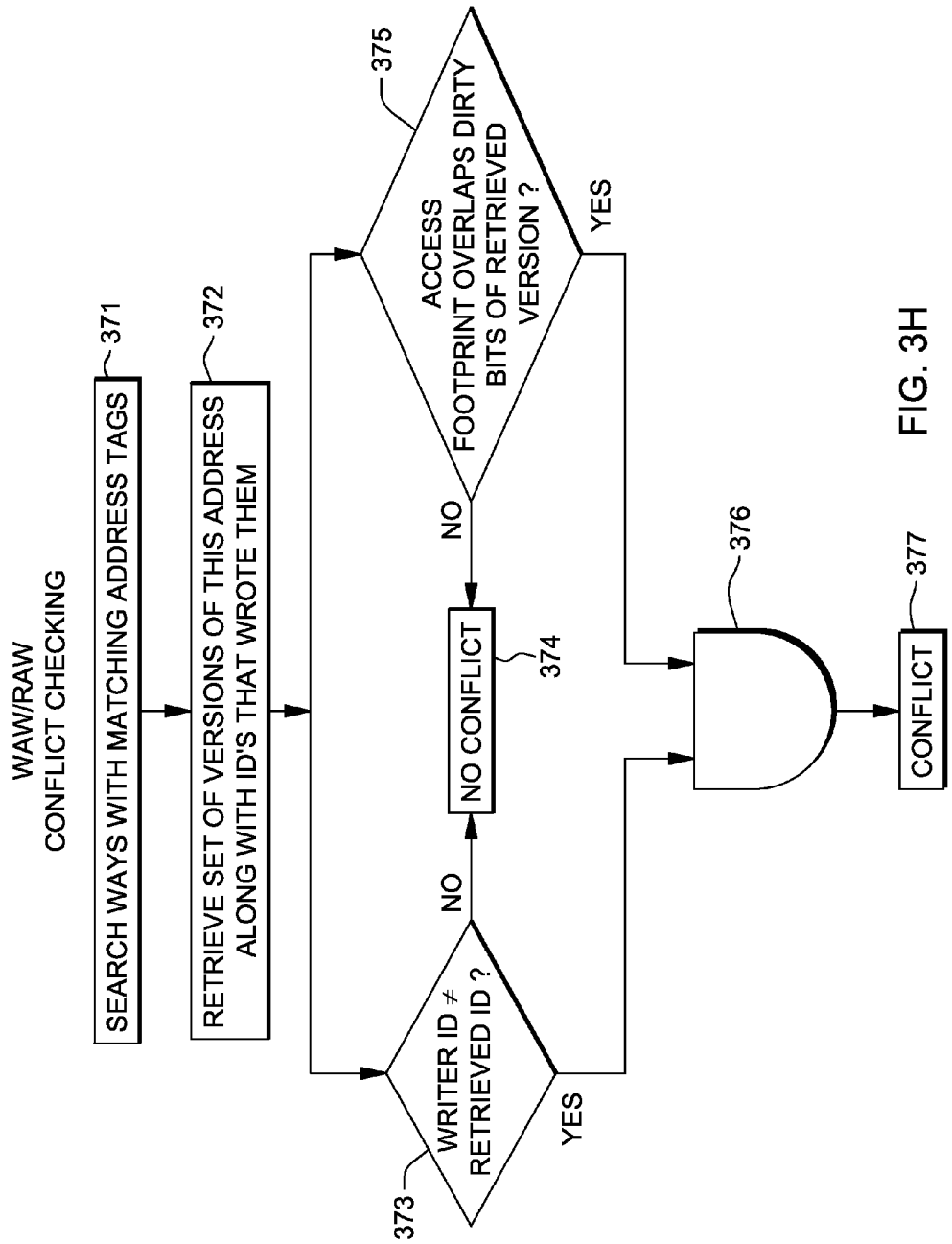
FIG. 3H is a flowchart relating to Write after Write ("WAW") and Read after Write ("RAW") conflict checking.

FIG. 3H shows the flow of WAW and RAW conflict checking. At 371, ways with matching address tags are searched to retrieve at 372 a set that has been written, along with the ID's that have written them. Then two checks are performed. The first at 373 is whether the writer ID is not equal to the access ID. The second at 375 is whether the access footprint overlaps the dirty bits of the retrieved version. In order for a conflict to be found at 377, both tests must come up in the affirmative per 376.

FIG. 3I-1 shows a first aspect of WAR conflict checking. There is a difference between the way this checking is done for TM and TLS, so the routine checks which are present at 381. For TM, WAR is only done on non-speculative versions at 382. For TLS, WAR is done both on non-speculative versions at 382 and also on speculative versions with younger, i.e. larger IDs at 383. More about ID order is described with respect to FIG. 4E-2.

FIG. 3I-2 shows a second aspect of WAR conflict checking. This aspect is done for the situations found in both 382 and 383. First the reader representation is read at 384. More about the reader representation is described with respect to FIG. 3D. The remaining parts of the procedure are performed with respect to all IDs represented in the reader representation per 385. At 386, it is checked whether the footprints overlap. If they do not, then there is no conflict 391. If they do, then there is also additional checking, which may be performed simultaneously. At 387, accesses are split into TM or TLS. For TM, there is a conflict if the reading ID is not the ID currently requesting access at 388. For TLS, there is a conflict if the reading ID was from a different domain or younger than the ID requesting access. If both relevant conditions for the type of speculative execution are met, then a conflict is signaled at 390.

TLS/TM/Rollback Management

The TLS/TM/Rollback capabilities of the memory subsystem are controlled via a memory-mapped I/O interface.

Global Speculation ID Management:

The management of the ID state is done at the L2 CENTRAL unit. L2 CENTRAL also controls how the ID state is split into domains and what attributes apply to each domain. The L2 CENTRAL is accessed via MMIO by the cores. All accesses to the L2 CENTRAL are performed with cache inhibited 8 B wide, aligned accesses.

The following functions are defined in the preferred embodiment:

| Name | number of instances | Access | Function |
| --- | --- | --- | --- |
| NumDomains | 1 | RD | Returns current number of domains |
|  |  | WR | Set number of domains. Only values 1, 2, 4, 8, 16 are valid. Clears all domain pointers. Not permitted to be changed if not all IDs are in available state |
| IdState | 1 | RD only | Returns vector of 128 bit pairs indicating the state of all 128 IDs |

| Name | number of instances | Access | Function |
|---|---|---|---|
| TryAllocAvail | 1 | RD only | 00b: Available<br>01b: Speculative<br>10b: Committed<br>11b: Invalid<br>Allocates an available ID from the set of IDs specified by groupmask. Returns ID on success, −1 otherwise. On success, changes state of ID to speculative, clears conflict register and sets A bit in conflict register. Groupmask is a 16b bit set, bit i = 1 indicating to include IDs 8*I to 8*i + 7 into the set of selectable IDs |
| Per domain: | | | |
| DomainMode | 16 | RD/WR | Bit 61:63: mode<br>000b: long running TLS<br>001b: short running TLS<br>011b: short running TM<br>100b: rollback mode<br>Bit 60: invalidate on conflict,<br>Bit 59: interrupt on conflict,<br>Bit 58: interrupt on commit,<br>Bit 57: interrupt on invalidate<br>Bit 56:0: commit to id 00; 1: commit to id 01 |
| AllocPtr | 16 | RD/WR | Read and write allocation pointer. Allocation pointer is used to define ID wrap point for TLS and next ID to allocate using TryPtrAlloc. Should never be changed if domain is TLS and any ID in domain is not available |
| CommitPtr | 16 | RD/WR | Read and write commit pointer. The commit pointer is used in PtrTryCommit and has no function otherwise. When using PtrTryCommit in TLS, use this function to step over invalidated IDs. |
| ReclaimPtr | 16 | RD/WR | Read and write reclaim pointer. The reclaim pointer is an approximation on which IDs could be reclaimed assuming their A bits were clear. The reclaim pointer value has no effect on any function of the L2 CENTRAL. |
| PtrTryAlloc | 0 × 104 + domain*0 × 10 | RD only | Same function as TryAllocAvail, but set of selectable IDs limited to ID pointed to by allocation pointer. On success, increments additionally the allocation pointer. |
| PtrForceCommit | 16 | N/A | Reserved, not implemented |
| PtrTryCommit | 16 | RD only | Same function as TryCommit, but targets ID pointed to by commit pointer. Additionally, increments commit pointer on success. |
| Per ID: | | | |
| IdState | 128 | RD/WR | Read or set state of ID:<br>00b: Available<br>01b: Speculative<br>10b: Committed<br>11b: Invalid<br>This function should be used to invalidate IDs for TLS/TM and to commit IDs for Rollback. These changes are not allowed while a TryCommit is in flight that may change this ID. |
| Conflict | 128 | RD/WR | Read or write conflict register: bit 57:63 conflicting ID, qualified by IC bit<br>bit 56: 1C bit, at least one ID is in conflict with this ID. Qualifies bits 57:63. Cleared if ID in 57:63 is invalidated<br>bit 55: A bit, if set, ID can not be reclaimed<br>bit 56: M bit, more than one ID with this ID in conflict<br>bit 53: N bit, conflict with non-speculative access<br>bit 52: R bit, invalidate due to resource conflict The conflict register is cleared on allocation of ID, except for the A bit. The A bit is set on allocation. The A bit must be cleared explicitly by software to enable reclaim of this ID. An ID can only be committed if the IC, M, N and R bits are clear. |
| ConflictSC | 128 | WR only | Write data is interpreted as mask, each bit set in the mask clears the corresponding bit in the conflict register, all other bits are left unchanged. |
| TryCommit | 128 | RD only | Tries to commit an ID for TLS/TM and to invalidate an ID for Rollback. Guarantees atomicity using a two-phase transaction. Succeeds if ID is speculative and IC, M, N and R bit of conflict registers are clear at the end of the first phase. Returns ID on success, −1 on fail. |

Processor Local Configuration:

For each thread, a speculation ID register 401 in FIG. 4 implemented next to the core provides a speculation ID to be attached to memory accesses of this thread.

When starting a transaction or speculative thread, the thread ID provided by the ID allocate function of the Global speculation ID management has to be written into the thread ID register of FIG. 4. this register. All subsequent memory accesses for which the TLB attribute U0 is set are tagged with this ID. Accesses for which U0 is not set are tagged as non-speculative accesses. The PowerPC architecture specifies 4 TLB attributes bits U0 to U3 that can be used for implementation specific purposes by a system architect.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice. Such media might be of any suitable type, such as magnetic, electronic, solid state, or optical.

Any algorithms given herein can be implemented as computer program code and stored on a machine readable medium, to be performed on at least one processor. Alternatively, they may be implemented as hardware. They are not intended to be executed manually or mentally.

The use of variable names in describing operations in a computer does not preclude the use of other variable names for achieving the same function.

The invention claimed is:

1. A computer method comprising carrying out operations in a multiprocessor system, the operations comprising:
    running at least one program thread within at least one processor of the system;
    recognizing a need for speculative execution in the thread;
    allocating a speculation ID to the thread;
    managing a pool of speculation IDs in accordance with a plurality of domains, such that IDs are allocated independently for each domain; and
    allocating a mode of speculative execution to each domain, wherein the mode of speculative execution comprises one or more of transactional memory (TM), thread level speculation (TLS), and rollback, said operations comprise implementing two distinct modes of speculation to be used concurrently wherein at least two domains are allocated to said respective distinct modes of speculative execution.

2. The method of claim 1, wherein the operations comprise: maintaining a central state table indicating a state of the speculation ID.

3. The method of claim 2, wherein the state table indicates one of the following states for the speculation ID: available, committed, speculative, invalid.

4. The method of claim 1, wherein the managing and allocating are conducted within a cache memory of the system.

5. A multiprocessor system comprising
    a plurality of processors running threads of program code in parallel in accordance with speculative execution; and
    facilities for enabling a first thread to operate in accordance with a first mode of speculative execution and a second thread to operate in accordance with a second mode of speculative execution, the first and second modes of speculative execution being different from one another and concurrent, wherein the first and second modes of speculative execution are selected from amongst: transactional memory (TM), thread level speculation (TLS), and rollback; and
    a central control unit configured to assign identification numbers to software threads undergoing speculative execution, said central control unit managing speculation identification numbers with respect to a pool of possible speculation identification numbers by dividing the pool into domains, each domain corresponding to a respective mode of speculative execution.

6. The system of claim 5, wherein one of the modes of speculative execution is a transactional memory scheme.

7. The system of claim 5, wherein one of the modes of speculative execution is a thread level speculation scheme.

8. The system of claim 5, wherein one of the modes of speculative execution is a rollback scheme.

9. The system of claim 5, wherein a subset of bits of a speculation identification numbers indicates a domain.

10. The system of claim 5, wherein the central control unit is configured to operate each domain independently with respect to allocating, checking, promoting and killing threads.

11. The system of claim 5, wherein the central control unit is configured to maintain an indicator with respect to each domain indicating what mode of speculative execution is assigned to that domain; and the indicator cannot be changed if any of the speculation identification numbers within the domain are currently associated with a thread still in speculative state.

12. The system of claim 5, comprising at least one hardware controlled pointer associated with a domain for managing thread identification numbers.

13. The system of claim 12, comprising, for each domain, hardware pointers comprising at least:
- an allocation pointer configured to indicate an identification number to be allocated to a next speculative thread;
- a commit pointer configured to indicate a boundary between committed and uncommitted threads; and
- a reclaim pointer configured to indicate a next identification number to be reclaimed from speculation.

14. The system of claim 12, wherein
each pointer is configured to wrap upon reaching a maximum value; and
the system comprises a control unit configured to prevent the allocation pointer from passing the reclaim pointer within each domain.

15. The system of claim 12, wherein each allocation pointer is configured to indicate, for a respective domain of speculation identification numbers, both a next available speculation identification number and also a wrap point from oldest to youngest speculation identification number.

16. The system of claim 12, wherein the facilities are disposed within a cache memory.

17. The system of claim 16, wherein the cache memory includes directory lookup facilities configured to maintain a record of each speculative write in conjunction with a speculation identification number of a thread responsible for that write.

* * * * *